(12) United States Patent
Abe

(10) Patent No.: US 8,468,290 B2
(45) Date of Patent: Jun. 18, 2013

(54) METHOD AND PROGRAM FOR FILE INFORMATION WRITE PROCESSING

(75) Inventor: Naoki Abe, Kawasaki (JP)

(73) Assignee: Fujistu Semiconductor Limited, Yokohama (JP)

( * ) Notice: Subject to any disclaimer, the term of this patent is extended or adjusted under 35 U.S.C. 154(b) by 425 days.

(21) Appl. No.: 12/212,439

(22) Filed: Sep. 17, 2008

(65) Prior Publication Data

US 2009/0024785 A1 Jan. 22, 2009

Related U.S. Application Data

(62) Division of application No. 11/235,336, filed on Sep. 27, 2005, now abandoned.

(30) Foreign Application Priority Data

Dec. 24, 2004 (JP) ................................ 2004-375074

(51) Int. Cl.
*G06F 17/30* (2006.01)
(52) U.S. Cl.
USPC .......................................... 711/100; 707/821
(58) Field of Classification Search
USPC ................. 711/225, 170, 103, 100; 707/705, 707/821
See application file for complete search history.

(56) References Cited

U.S. PATENT DOCUMENTS

| | | | |
|---|---|---|---|
| 6,714,949 B1 * | 3/2004 | Frey, Jr. ................................. | 1/1 |
| 2004/0111582 A1 | 6/2004 | Maeda et al. | |
| 2005/0052550 A1 * | 3/2005 | Sato ............................ | 348/231.2 |
| 2005/0262033 A1 * | 11/2005 | Yamashita ........................ | 707/1 |
| 2007/0183179 A1 * | 8/2007 | Maeda et al. ................... | 365/52 |

FOREIGN PATENT DOCUMENTS

| | | | |
|---|---|---|---|
| EP | 1653362 | * | 5/2006 |
| JP | 2002-7204 | | 1/2002 |
| JP | 2003-169293 | | 6/2003 |
| JP | 2003-271408 | | 9/2003 |
| JP | 2004-157997 | | 6/2004 |
| WO | PCT/JP2004/011427 | * | 8/2004 |
| WO | WO 2005015406 | * | 2/2005 |

OTHER PUBLICATIONS

U.S. Appl. No. 11/235,336, filed Sep. 27, 2007 Abe, Naoki, Fujitsu Limited.
Japanese Office Action issued Jun. 15, 2010 in corresponding Japanese Patent Application 2004-375074.
Notice of Rejection Grounds for corresponding Japanese Patent Application 2004-375074; mailed Nov. 30, 2010.

* cited by examiner

*Primary Examiner* — Hung T Vy
(74) *Attorney, Agent, or Firm* — Staas & Halsey LLP

(57) ABSTRACT

The file information write processing method according to the present invention is a file information write processing method wherein a computer executes a process for outputting instruction corresponding to a file information write instruction from an application to a device driver, wherein: searching clusters which are empty areas within an actual data area of a memory unit of the computer, and obtaining the search result; if clusters which are empty areas exist, writing information to overwrite to one or more clusters within the actual data area of the memory unit which is a target of the write instruction from the application, to the clusters which are empty areas; and freeing clusters which were to be overwritten by the information written to the empty area clusters.

2 Claims, 27 Drawing Sheets

METHOD AND PROGRAM FOR FILE INFORMATION WRITE PROCESSING

CROSS-REFERENCE TO RELATED APPLICATIONS

This application is based upon and hereby claims the benefit of priority to U.S. application Ser. No. 11/235,336 filed on Sep. 27, 2007, which claims priority from the prior Japanese Patent Application No. 2004-375074, filed in Dec. 12, 2004, the entire contents of both of which are incorporated herein by reference.

FIELD OF THE INVENTION

The present invention relates to a processing method for writing file information and program thereof.

BACKGROUND OF THE INVENTION

File access within a computer system is realized through a combination of three programs: application; file system (middleware); and device driver. Here, application refers to various application programs such as word processors and CAD software. Device driver refers to a control program which performs read/write on each area within a (nonvolatile) secondary memory, such as magnetic disks and flash memory, wherein stored contents are retained even when power is tuned off. File system (middleware), which is provided between application and device driver, performs a process for outputting instructions corresponding to the write instructions from the application to the device driver.

With a file system such as this, when power supplies were unexpectedly cut off during writing data and a write failure occurs, problems frequently lie in how the information in the file relevant to the write is restored. From this relation, methods addressing write failures such as this are disclosed in many references such as Patent Reference 1.

[Patent Reference 1]
Japanese Patent Laid-Open Publication No. 2003-169293 "Data recorder/player, means for recording and playing data, and digital camera"

DESCRIPTION OF THE RELATED ART

The following are explanations of an instance where a write instruction sent from the application to the file system is a file overwrite instruction and an instance where the write instruction is a file move instruction, during file access by a computer.

First, the process performed by the middleware corresponding to an overwrite instruction when the overwrite instruction is given to the middleware from the application is explained.

FIG. 1 is a diagram showing the data configuration of the file system.

As shown in FIG. 1, the file system comprises three areas: a boot sector; file allocation table (FAT); and an actual data area.

Here, information regarding the entire file system, such as the file system capacity, the size of the cluster which is the processing unit of the actual data area, and the position of the root directory within the actual data area, are described in the boot sector. In addition, pointer information which indicates which cluster a cluster is connected to is stored in each entry of the FAT corresponding to individual clusters within the actual data area. If the cluster has no connection destination, "End" is set in this pointer information. If the cluster is freed, "NULL" is set in this pointer information (shown as blank in the diagram). In other words, data retained within the clusters corresponding to entries within FAT wherein a pointer value other than "NULL" is set is data which has meaning.

Furthermore, the actual data area that is used is separated into (processing) units called clusters, and actual information regarding files and directories are stored therein. In FIG. 1, for simplicity, actual data area is divided into 16 clusters, and these clusters have head addresses of hexadecimal numerals 0 to 15, in sequence, with the progression from the upper-right to the lower-left; in other words, "0x0", "0x", "0x2", "0x3", "0x4", "0x5", "0x6", "0x7", "0x8", "0x9", "0xA", "0xB", "0xC", "0xD", "0xE", and "0xF".

For example, in FIG. 1, it is understood, by referring to the boot sector, that the root director of the actual data area corresponds to the "0x0" cluster, and from the contents of this "0x0" cluster, it is indicated that a file (File1), of which the data length (Length)=5 and the head actual data (Data1) is in the "0x1" cluster, exists in this root directory as a directory entry.

Since information regarding the interconnection of clusters within the actual data area is stored in the FAT, in FIG. 1, it is understood, by referring to the FAT, that data (Data 2) of the "0x2" cluster exists as the subsequent data of data (Data 1) of the "x1" cluster, data (Data 3) of the "0xB" cluster exists as the subsequent data of data (Data 2) of the "0x2" cluster, data (Data 4) of the "0xE" cluster exists as the subsequent data of data (Data 3) of the "0xB" cluster, and data (Data 5) of the "0x5" cluster exists as the subsequent data of data (Data 4) of the "0xE" cluster. In addition, since the FAT entry corresponding to this "0x5" cluster is "End", it is understood that the data in this file (File 1) ends with data (Data 5) of this "0x5" cluster. Here, the fact that directory entry File1 (of the root directory) is configured so that Data 1, Data 2, Data 3, Data 4, and Data 5 are connected in sequence is represented as is shown in the bottom row of FIG. 1.

Overwrite instruction is given in regards to File1, such as this, from the application which output this File 1. FIG. 2 is a diagram showing the state of the file before overwrite instruction is made.

File system (middleware) specifies the (one or plural) cluster(s) within the secondary memory (actual data area) which is the target of write, implementing information regarding the starting location and the length of the overwrite comprised in the file overwrite instruction from the application. Here, clusters corresponding to Data 2, Data 3, and Data 4 are considered clusters which have been specified as such.

In other words, first, the content of the cluster corresponding to Data 2 is overwritten as shown in FIG. 3; next, the content of the cluster corresponding to Data 3 is overwritten as shown in FIG. 4; and furthermore, the content of the cluster corresponding to Data 4 is overwritten as shown in FIG. 5.

FIG. 6 is a flowchart of a conventional overwrite process.

In FIG. 6, first, data overwrite (write) process is performed on one or plural cluster(s) within the actual data area specified as overwrite target in Step S101. In the subsequent step S102, file information, for example last update time information, is changed (updated).

However, if file overwrite is performed by a procedure such as this, when, for example, a write failure such as power supply interruption occurs during the first, second, and third write, such as that shown in FIG. 3, FIG. 4, or FIG. 5, the data of the cluster which is being written, in other words the cluster corresponding to Data 2, Data 3, or Data 4, is stored to the secondary memory in an incomplete state. This means, the period from the start of overwrite of the cluster corresponding to Data 2 in FIG. 3 until before the completion of overwrite of the cluster corresponding to Data 4 in FIG. 5 is a period wherein incomplete data will be left within the secondary memory if a power supply interruption or the like occurs. In other words, it is a period wherein there is risk of data damage.

The process performed by the middleware regarding a file move instruction when the file move instruction is given to the middleware from the application is explained next.

FIG. 7 is a diagram showing data configuration before the file is moved. Parts within the explanation of FIG. 7 which overlap with that of FIG. 1 are basically omitted.

In FIG. 7, it can be understood from the contents of the boot sector (not shown) that the "0x0" cluster is referenced as the cluster within the actual data area which corresponds to the directory entry in directory dir, and from the contents of this directory dir, directories dir1 and dir2 exist below this directory dir, the directory entry of directory dir1 is stored in the "0x3" cluster, and the directory entry of directory dir2 is stored in the "0x4" cluster.

It can be understood, by referencing the "0x3" cluster, that directory dir1 holds file file1, its data length=3, and the head data of this file1 is stored in the "0x1" cluster. In addition, it can be understood, by referencing the "0x4" cluster, that directory dir2 holds file file2, its data length=3, and the head data of this file2 is stored in the "0x8" cluster. Furthermore, as stated earlier, by referencing the FAT, it can be understood that file file1 has a configuration wherein the clusters of Data1, Data2, and Data3 are connected in the sequential order of Data1, Data2, and Data3. Also, file file2 has a configuration wherein the clusters of Data4, Data5, and Data6 are connected in the sequential order of Data4, Data5, and Data6.

In other words, it can be understood that the actual data area and the FAT shown in the lower half of FIG. 7 indicate a file (directory) configuration such as that shown in the upper half of FIG. 7.

Explained below is an instance wherein ¥dir¥dir1¥file1 is moved to ¥dir¥dir2¥file2, in reference to FIG. 8 to FIG. 10. In the example shown in FIG. 7, this move process involves file overwrite because ¥dir¥dir2¥file2 already exists in the destination of the movement.

FIG. 8 shows the process performed by the file system for the move instruction from the application. In FIG. 8, first, when the file system receives the information above, stating "move ¥dir¥dir1¥file1 to ¥dir¥dir2¥file2", from the application, and after the directory entry in file file1 of the source of the movement of the actual data area within the secondary memory is loaded to a primary memory based on this information, this directory entry in file file1 of the source of the movement is deleted from the actual data area within the secondary memory.

Subsequently, as shown in FIG. 9, file2, which is a file that already exists in the destination of the movement, is deleted. In other words, this directory entry in file file2 of the destination of the movement is deleted from the actual data area within the secondary memory, and at the same time, point information of entries corresponding to Data4, Data5, and Data6, as actual data which configures file file2 is cleared from the FAT (the chain subsequent to the entry corresponding to Data4 is cleared).

Then, as shown in FIG. 10, based on the information of the directory entry of the file file1 of the source of the movement held in the primary memory, file file2 is created (the file2 information is written) in the directory entry of the directory dir2 within the actual data area so as to point the head actual data Data1 of the file file1 of the source of the movement.

FIG. 11 is a flowchart of a conventional file move process.

In FIG. 11, first, after the directory entry in the file of the source of the movement of the actual data area within the secondary memory is loaded into the primary memory, the directory entry in the file of the source of the movement is deleted from the actual data area within the secondary memory in step S201. Then, in step S202, whether or not the file is overwritten at the destination of the movement is determined. If it is determined that overwrite is performed in step S202, the file already existing in the destination of the movement is deleted in step S203, and the process advances to step S204. On the other hand, if it determined that overwrite is not performed in step S202, the process immediately advances to step S204.

In step S204, file information of the destination of the movement is written to the directory entry in the directory of the destination of the movement so as to point the head actual data of the file of the source of the movement. Although the file is the target to be moved in each of the steps explained above, directories can also be the targets of the movement. To enable the procedure to accommodate both files and directories, add step S205 which determines whether or not the target to be moved is a directory, and, when the target to be moved is a directory, step S206 which changes (updates) information regarding parent directory ". ." of the directory to be moved.

If file move is performed by procedures such as that explained above, the period from after the file file1 information of the source of the movement is deleted from the directory entry of file file1 of this source of the movement of the actual data area within the secondary memory in FIG. 8 until this file file1 information of the source of the movement is read from the primary memory in FIG. 10 is a period wherein information regarding location of the cluster which stores the head actual data of the file of the source of the movement vanishes when a write failure such as power supply interruption occurs, or in other words, this is a period wherein there is risk of data damage.

SUMMARY OF THE INVENTION

The objective of the present invention is to provide a write processing method and program which enables shortening of the period wherein there is risk of data damage when power supply interruption and the like occur.

The file information write processing method of the first aspect of the present invention is a file information write processing method wherein a computer executes a process for outputting instruction corresponding to a file information write instruction from an application to a device driver, wherein: searching clusters which are empty areas within an actual data area of a memory unit of the computer, and obtaining the search result; if clusters which are empty areas exist, writing information to be overwritten to one or more clusters within the actual data area of the memory unit which is a target of the write instruction from the application, to the clusters which are empty areas; and freeing clusters which were to be overwritten by the information written to the empty area clusters.

Here, since data which should be overwritten to the cluster specified as the write target is written to the cluster of the empty area within the actual data area which has been searched and obtained, if as many of these clusters which are empty areas as there are clusters which are write targets are secured, the data to be overwritten can be written to this empty area cluster all at once. In this case, by comparing this to the conventional example wherein data is directly overwritten to this write target cluster, it is possible to eliminate the risk of storing incomplete data within the actual data area due to the power supply interruption during the data overwrite, so when a power supply interruption and the like occur, the period wherein there is risk of data damage is shortened. Data to be overwritten refers to update information, or in other words, "Data New" (shown in FIGS. 15 to 18 as Data2 New, Data3 New, and Data4 New).

The file information write processing method of a second aspect of the present invention is a file information write processing method wherein a computer executes a process for outputting instruction corresponding to a file information write instruction from an application to a device driver, wherein: searching entries of the directory in a destination of a movement to determine whether or not the write instruction is a file move which is accompanied by overwrite, changing or generating a directory entry of a file in the destination of the movement so as to link to actual data of a file in the source of the movement in a state wherein the link between the directory entry of a file in the source of the movement and actual data of the file in the source of the movement is kept, according to whether or not said write instruction is a file move which is accompanied by overwrite; deleting the directory entry of the file in the source of the movement.

Here, the change or the generation of the directory entry of the file of the destination of the movement is made so as to link to the actual data in the file of the source of the movement in a state wherein the link between the directory entry of the file of the source of the movement and the actual data of the file of the source of the movement is kept, the period wherein the information of the file of the source of the movement only exists in the primary memory, as in the conventional example, is eliminated, and the period wherein risk of data damage exists, when power supply interruption and the like occurs, can be shortened.

According to the present invention, because data which should be overwritten to the cluster specified as write target is written to the cluster of the empty area within the actual data area which has been searched and obtained, data which should be overwritten can be written to the empty area cluster all at once, when as many of these clusters which are empty areas as there are clusters which correspond to the data comprised in the write instruction from the application are secured. In this case, by comparing this to the conventional example wherein data is directly overwritten to this write target cluster, it is possible to eliminate the risk of storing incomplete data within the actual data area due to the power supply interruption during data overwrite, so when a power supply interruption and the like occur, the period wherein there is risk of data damage is shortened.

In addition, according to the present invention, the change or the generation of the directory entry of the file of the destination of the movement is made so as to link to the actual data in the file of the source of the movement in a state wherein the link between the directory entry of the file of the source of the movement and the actual data of the file of the source of the movement is kept, the period wherein the information of the file of the source of the movement only exists in the primary memory, as in the conventional example, is eliminated, and the period wherein risk of data damage exists, when power supply interruption and the like occurs, can be shortened.

BEST MODE OF CARRYING OUT THE INVENTION

The embodiments of the present invention are explained in detail below in reference to diagrams.

Figure 1:
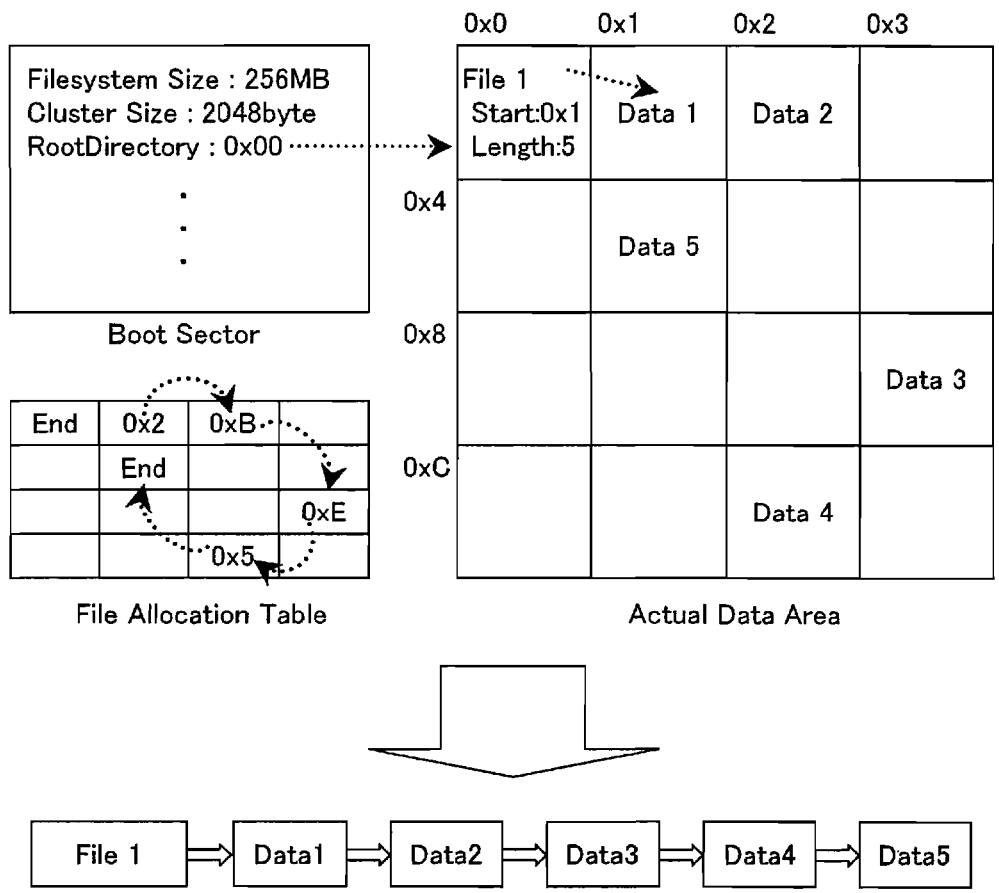
FIG. 1 is a diagram which shows the data configuration of a file system.
Figure 2:
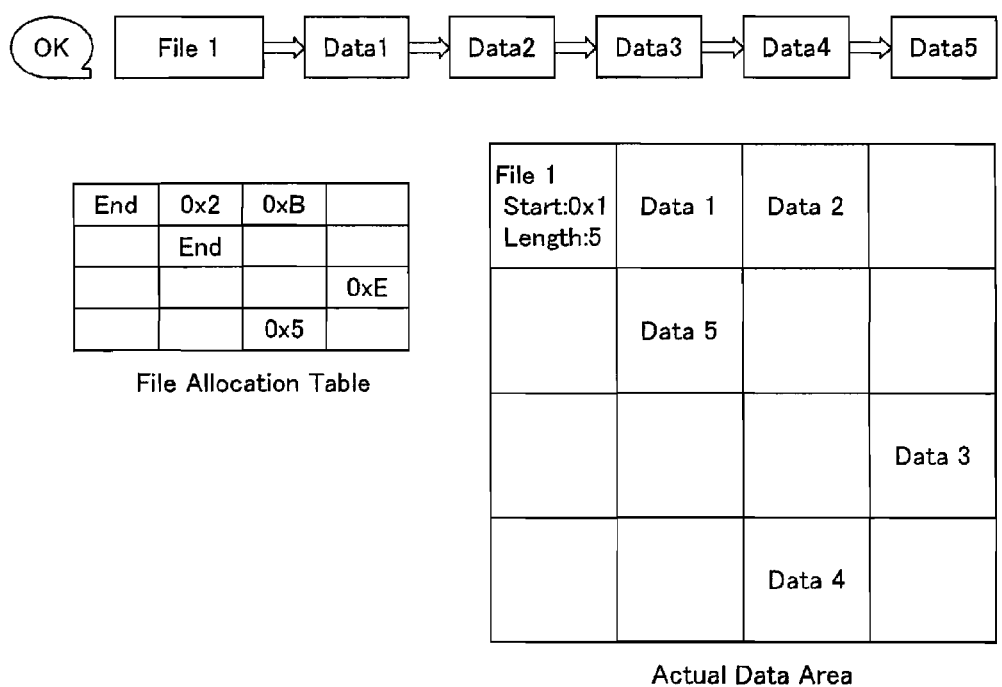
FIG. 2 is a diagram showing the file state before receiving an overwrite instruction.
Figure 3:
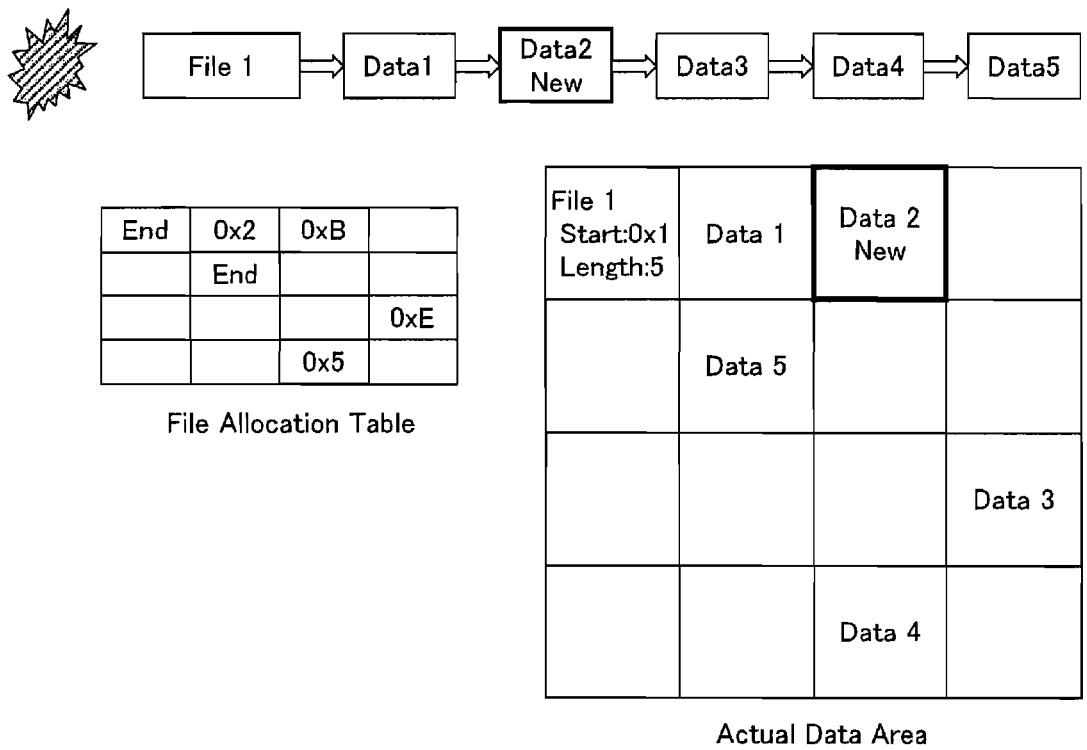
FIG. 3 is a diagram (No. 1) explaining the operation of a conventional file system after receiving an overwrite instruction.
Figure 4:
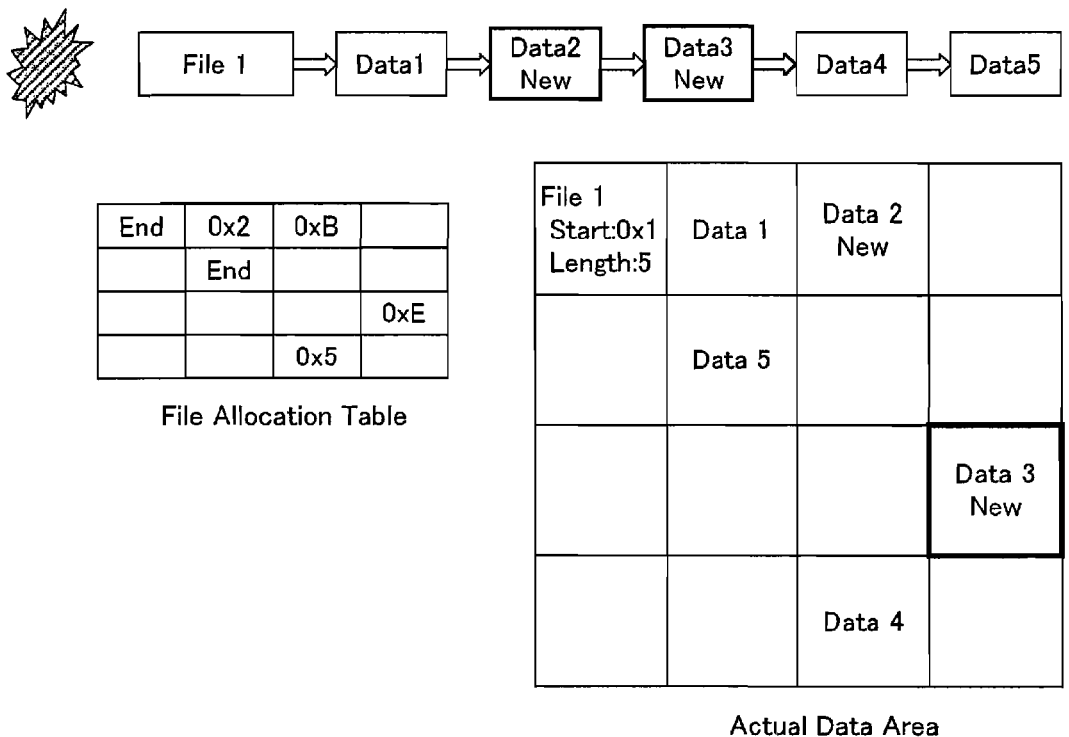
FIG. 4 is a diagram (No. 2) explaining the operation of a conventional file system after receiving an overwrite instruction.
Figure 5:
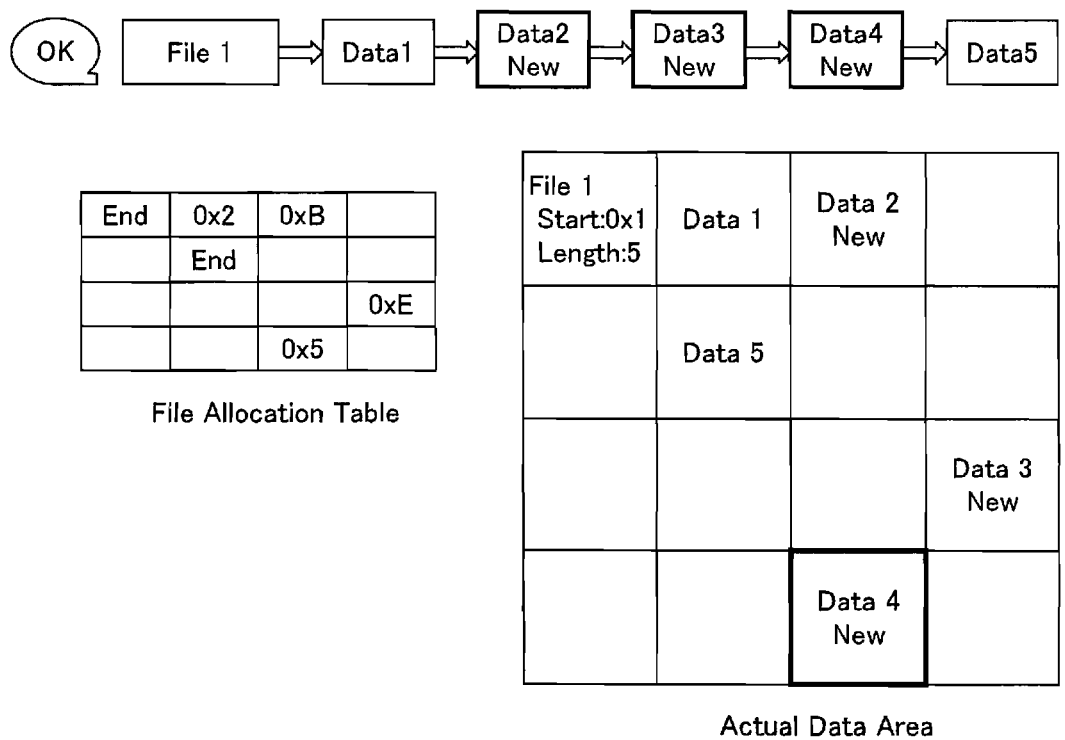
FIG. 5 is a diagram (No. 3) explaining the operation of a conventional file system after receiving an overwrite instruction.
Figure 6:
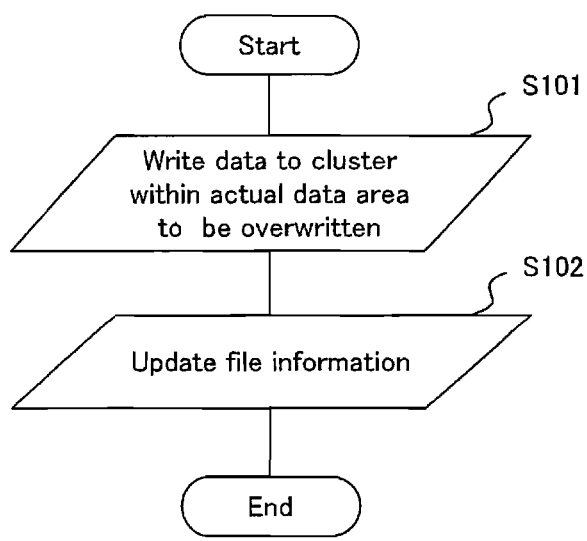
FIG. 6 is a flowchart showing the processing of a conventional file system after receiving an overwrite instruction.
Figure 7:
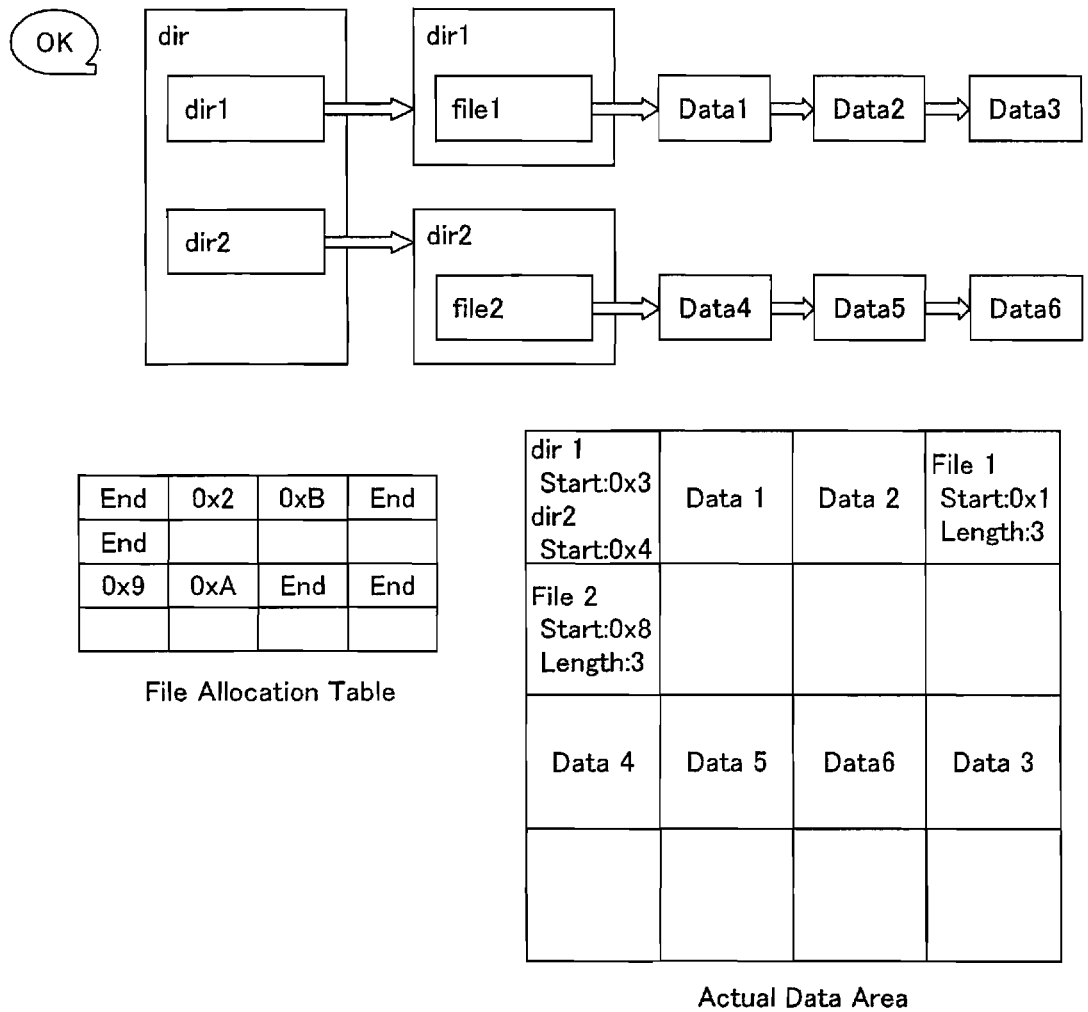
FIG. 7 is a diagram showing the file state before receiving a move instruction.
Figure 8:
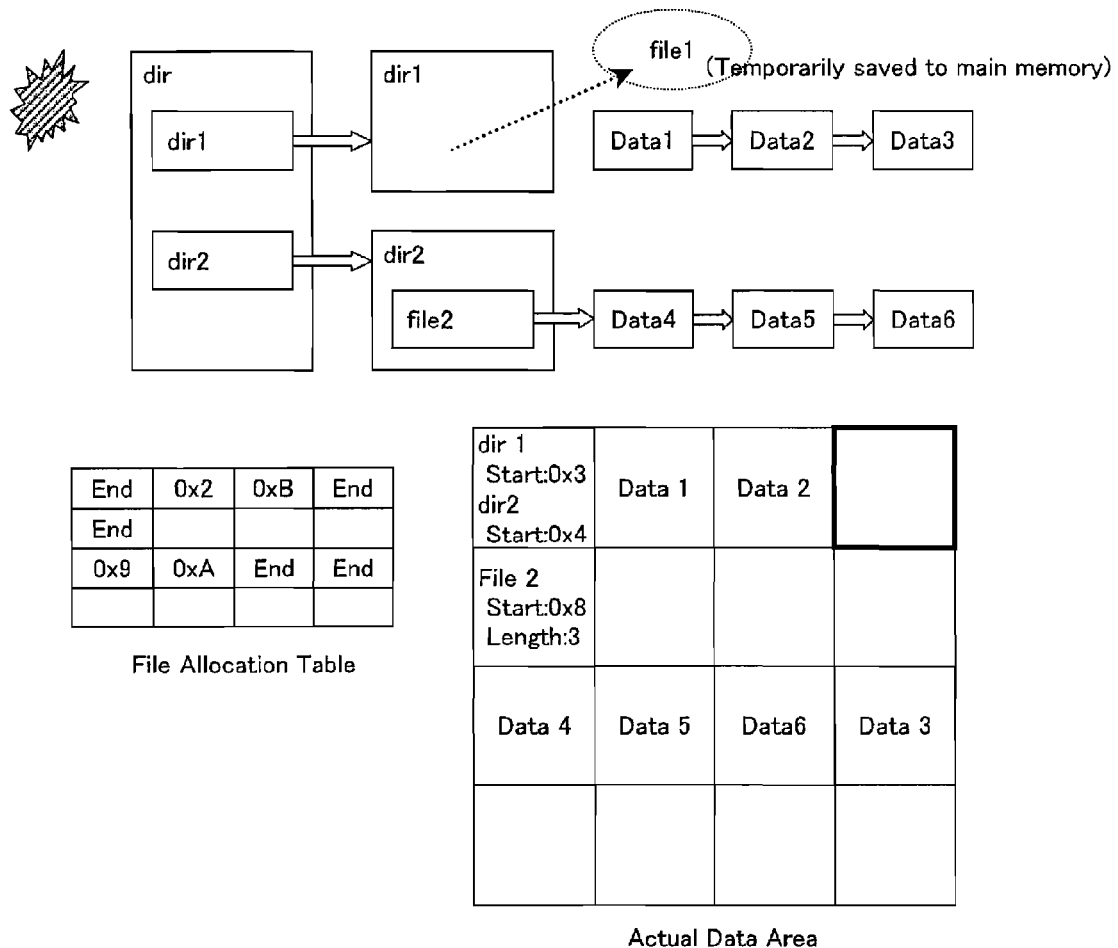
FIG. 8 is a diagram (No. 1) explaining the operation of a conventional file system after receiving a move instruction.
Figure 9:
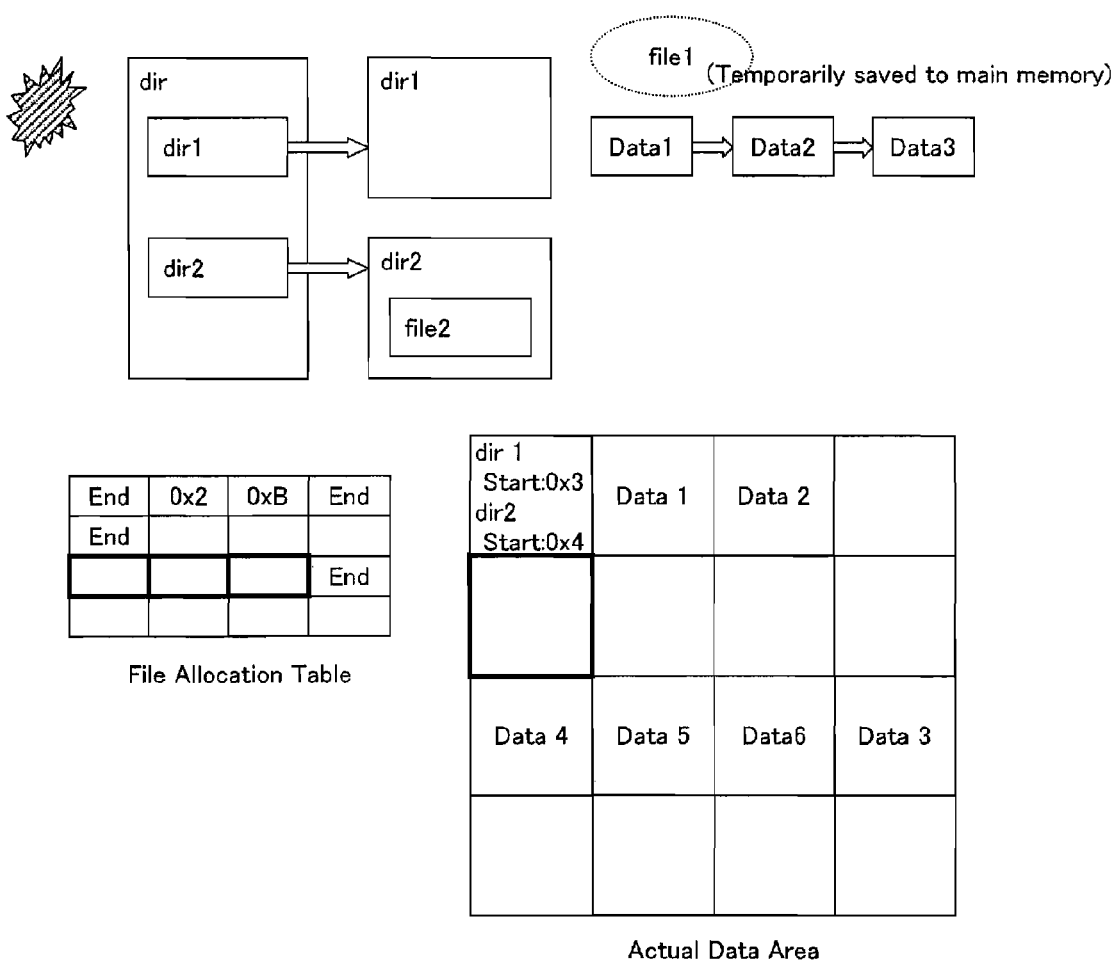
FIG. 9 is a diagram (No. 2) explaining the operation of a conventional file system after receiving a move instruction.
Figure 10:
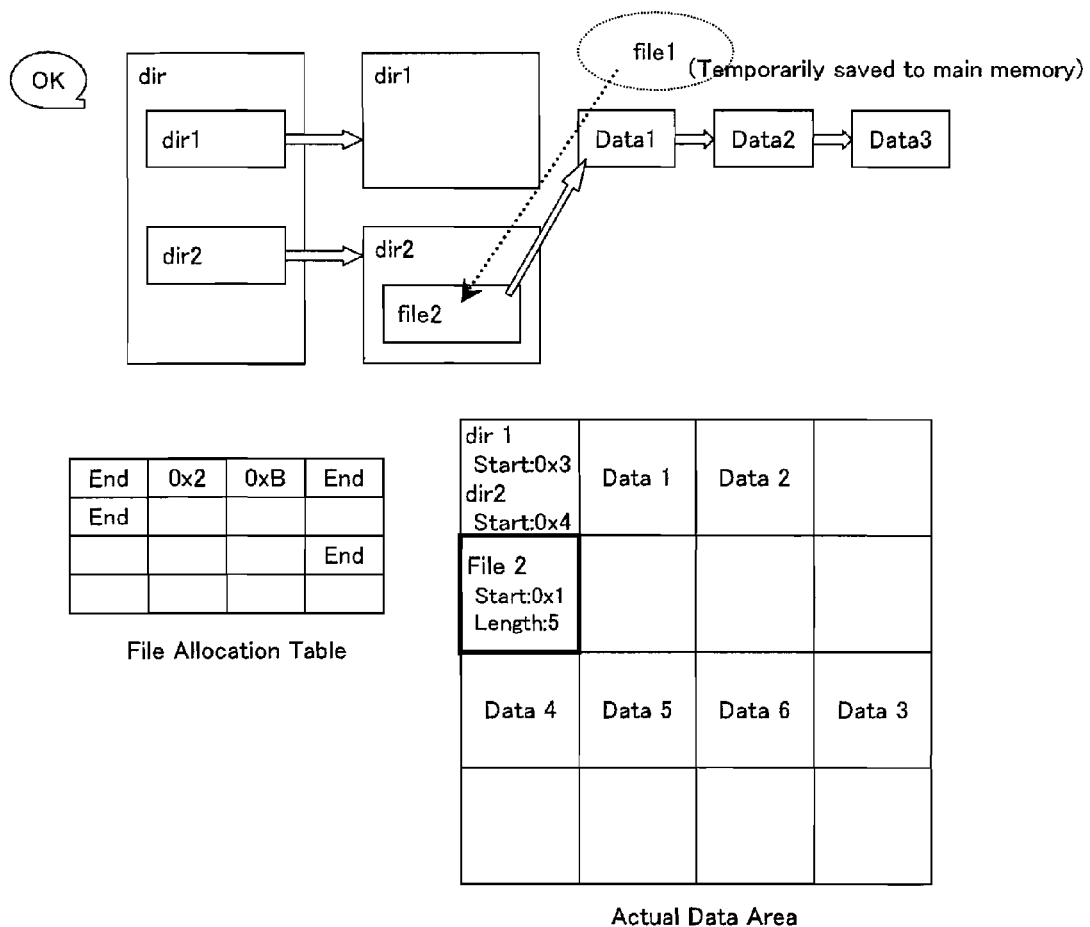
FIG. 10 is a diagram (No. 3) explaining the operation of a conventional file system after receiving a move instruction.
Figure 11:
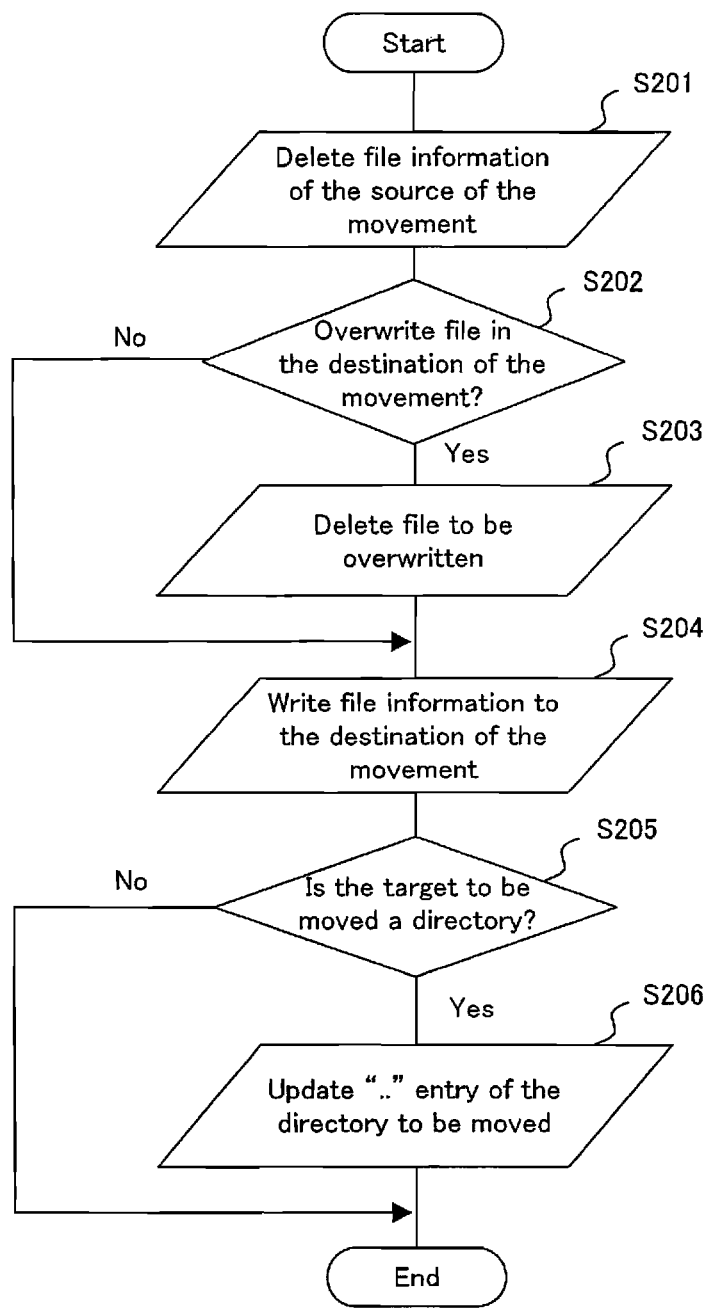
FIG. 11 is a flowchart showing the processing of a conventional file system after receiving a move instruction.
Figure 12:
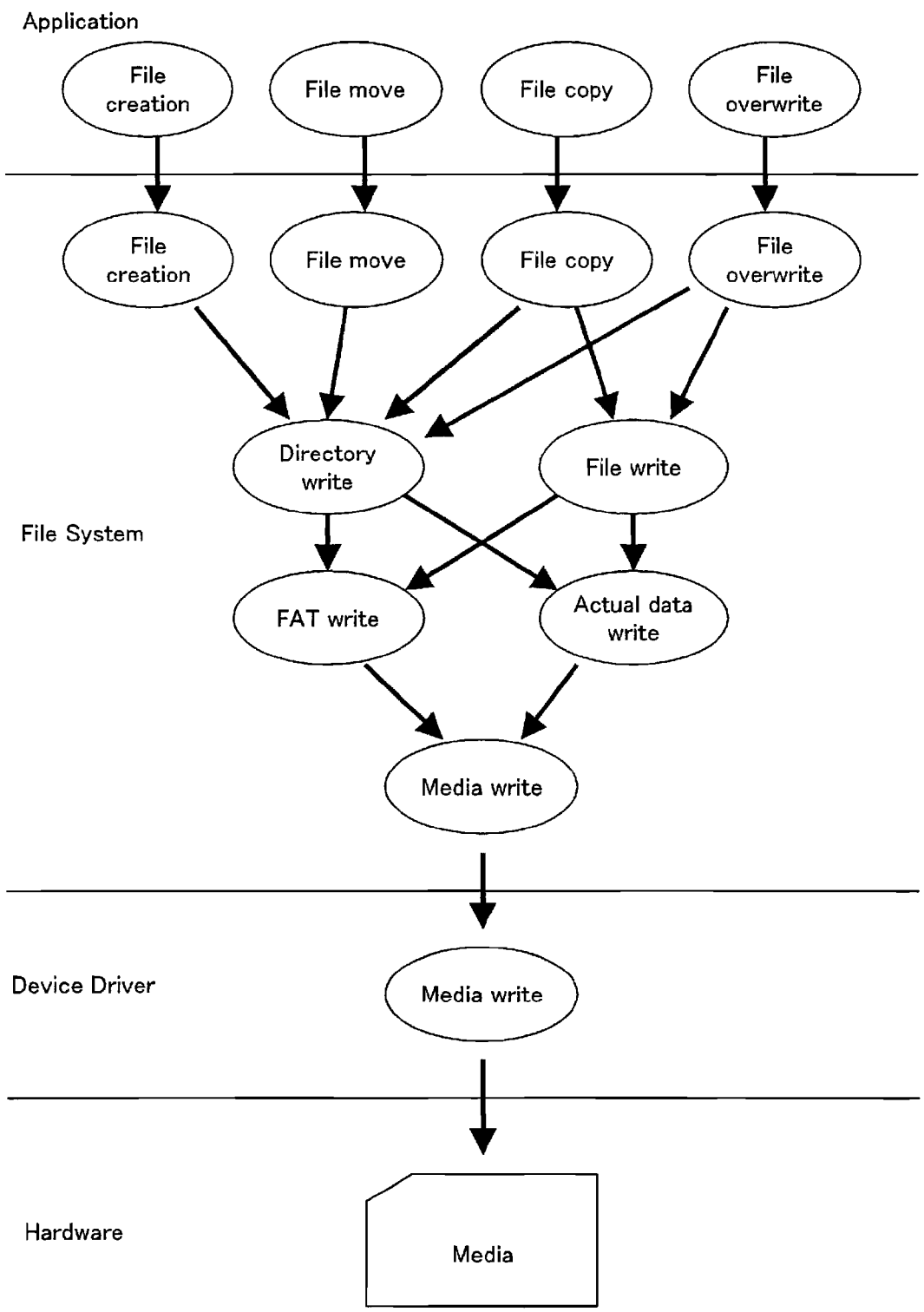
FIG. 12 is a diagram explaining call relation between the processing of the entire system comprising a file system.

FIG. 12 is a diagram explaining call relation between the processing of the entire system comprising a file system. As is shown in FIG. 12, process corresponding to each instruction from the application, "file creation", "file move", "file copy"

and "file overwrite", is booted by the file system (middleware) side. For example, the file to be created is added to a directory entry in response to "file create". Also, the directory entries of the directory of the source of the movement and the directory of the destination of the movement are changed in response to "file move". In addition, the file to be copied is added to the directory entry of the copy destination directory, and at the same time, the actual data of this file to be copied is created in the actual data area in response to "file copy". Furthermore, data which should be written to the cluster within the actual data area which is the file overwrite target is written to the empty area cluster(s), and at the same time, FAT information is changed according to this write process.

Figure 13:
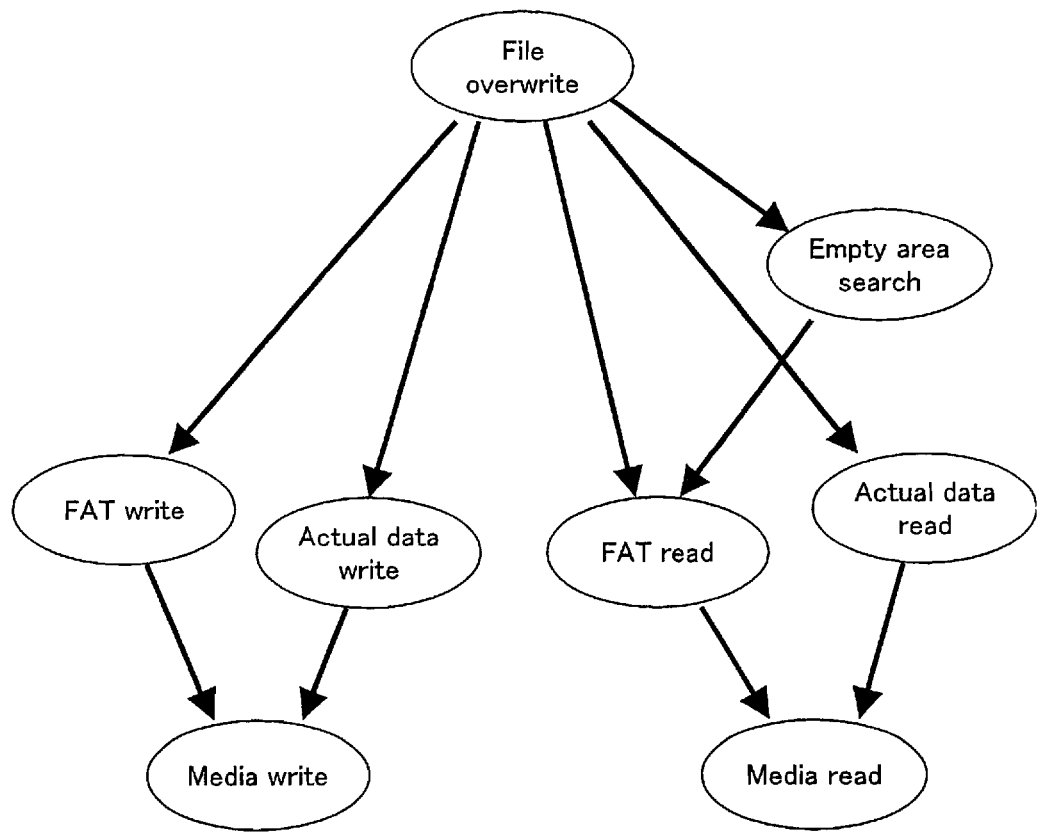
FIG. 13 is a diagram showing the call relation between the processing booted at the file system-end when the instruction from an application is to overwrite a file.

FIG. 13 is a diagram showing the call relation between the processing booted at the file system-end when the instruction from an application is to overwrite a file. As is shown in FIG. 13, when an overwrite instruction of a file (output by an application) is output from the application to the file system-end, the corresponding "file overwrite" process is called at this file system-end.

From this "file overwrite" process, each of the following processes are called: a "empty area search" process which is performed by reading the FAT; and various processes for updating data in FAT and the actual data area, or in other words, "FAT read" and "actual data read" processes which read these FAT and actual data areas from a media (secondary memory) to a primary memory, and "FAT write" and "actual data write" processes which write data of the FAT and actual data area updated in the primary memory to a media (secondary memory).

Figure 14:
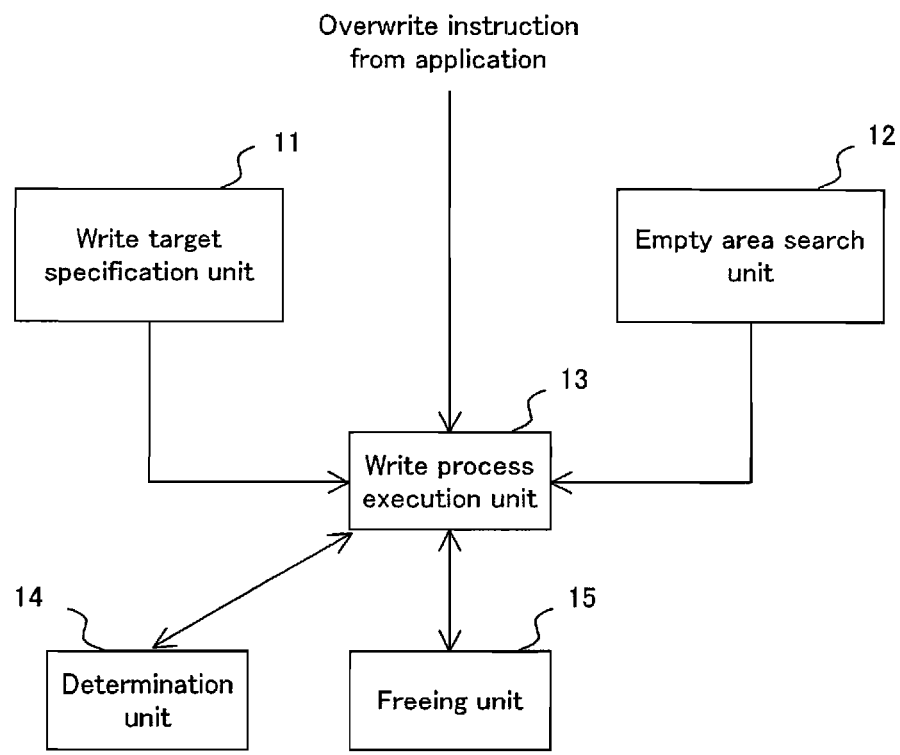
FIG. 14 is a block diagram showing the configuration of a write processing unit in a first embodiment of the present invention.

FIG. 14 is a block diagram showing the configuration of a write processing unit in a first embodiment of the present invention.

In FIG. 14, the write processing unit is configured between the application and the device driver and performs processing for outputting instruction corresponding to the file information write instruction from the application to the device driver. This file information write instruction from the application is retained within the primary memory as information to be overwritten which comprise the overwrite start position, length, and data having the length.

In FIG. 14, the write processing unit, comprises: write target specification unit 11 for specifying (one or plural) cluster(s) which will be the target of the write instruction, based on file information write instruction from the application; empty area search unit 12 for searching clusters which are empty areas within the actual data area of the secondary memory and obtaining the search result; write process execution unit 13 for writing information to be overwritten to one or more clusters within this actual data area of the secondary memory which is the target of the write instruction from the application, to the empty area clusters, if the empty area clusters exist; freeing unit 15 for freeing clusters which were to be overwritten by the information written to the empty area clusters, out of the clusters which are the target of the write instruction; and a determination unit 14 for determining whether or not there are sections which have not been written to the empty area clusters, out of the data included in the write instruction (information to be overwritten). Each unit in FIG. 14 corresponds, for example, to combinations of CPU 51 and RAM 53 in FIG. 26.

The operations of the write processing unit in this embodiment are explained below.

First, when write process execution unit 13 receives a file overwrite instruction from the application, write target specification unit 11 and empty area search part 12 are booted with the reception of this overwrite instruction acting as the trigger.

In write target specification unit 11, the (one or plural) cluster(s) within the secondary memory (actual data area) which is to be the target of the write instruction is specified using information of the starting position and length of the overwrite within the information to be overwritten which is included in this write instruction from the application. In addition, empty area search part 12 reads (references) the FAT, and searches the empty area clusters (clusters which are not in use) within the actual data area and obtains the search result.

Write process execution unit 13 which received the search result information from empty area search unit 12, for example, information indicating the location of the empty area cluster, determines whether or not the empty area cluster exists in the actual data area from this search result information. If the cluster exists, information which should be overwritten to the (one or plural) cluster(s) within the actual data area which is the specified target of the write instruction is written to the empty area cluster within the search results by write process execution unit 13. Although there are cases wherein data sections which are not changed are comprised in the head cluster and tail cluster of the actual data area, in these cases, the unchanged data section and the data section to be newly overwritten are merged by the merge part (not illustrated), and data which should be written to these clusters is created.

After this write process, corresponding clusters, within the clusters which are targets for the write instruction, of which the information written to the empty area cluster was to be overwritten are freed. Then, whether or not there are sections, out of the data included in the write instruction, which are not written to the empty area cluster is determined by the determination unit 14.

If such sections exist in the data included in the write instruction, the empty area search unit 12 is again activated by the write process execution unit 13, and the search for clusters which are empty areas is executed. In this search, because empty areas greater than or equal the number of clusters freed by freeing unit 15 are obtained, write process execution unit 13 performs a write process on these empty areas greater than or equal the number of freed clusters. Then, in this same way, the freeing process of the clusters which the information written to the empty area cluster was to be overwritten is performed by freeing unit 15.

The process of the write processing unit for processing a file overwrite instruction from the application is explained below, in reference to FIG. 15 to FIG. 18. However, in these diagrams, for comparison with prior art, it is assumed that the same overwrite instruction is given from the application the same file configuration as that implemented in the prior art.

Figure 15:
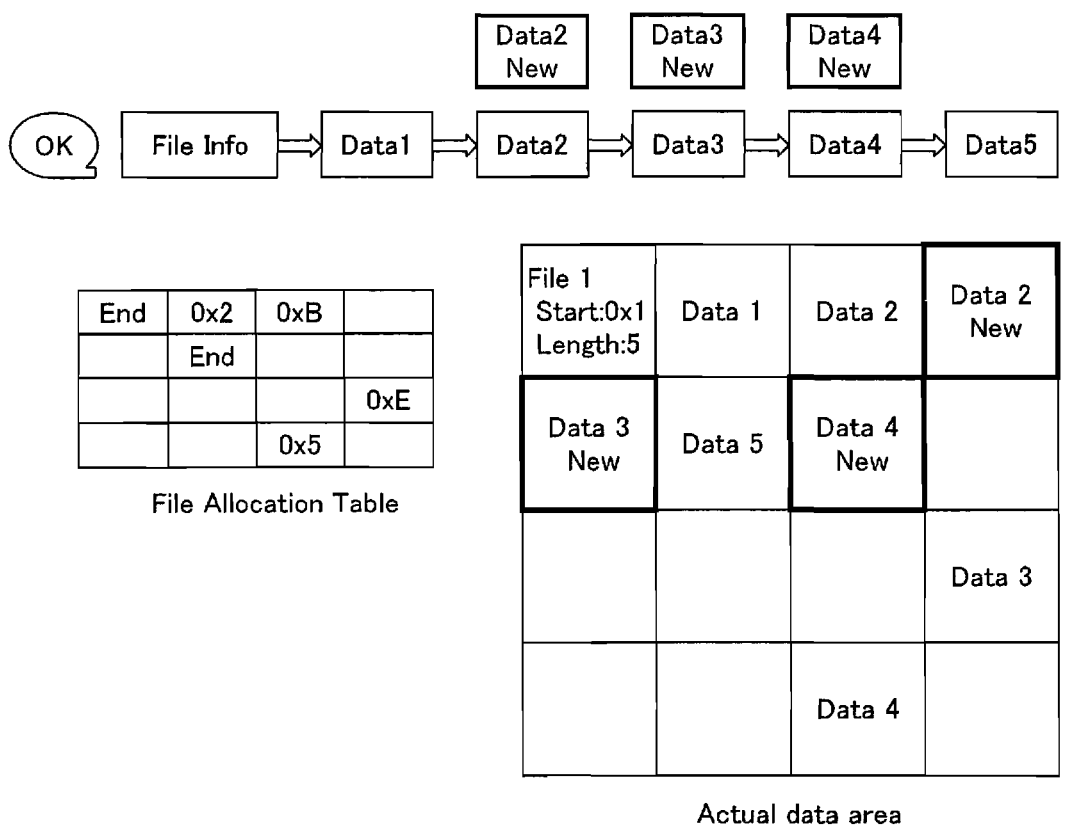
FIG. 15 is a diagram (No. 1) explaining the operations of the write processing unit in the first embodiment.

In other words, as is in the case of the prior art, in FIG. 15, the clusters which are to be overwrite targets within the actual data area are specified as clusters corresponding to Data2, Data3, and Data4 by write target specification unit 11, based on the information on the starting position and length of the overwrite included in the overwrite instruction from the application.

In this present embodiment, as described above, FAT is read by the empty area search unit 12, and clusters which correspond to entries of this FAT, having the NULL pointer (shown as blank within the diagram) are determined to be empty area clusters. In this case, new data (Data1 New, Data2 New, and Data3 New) corresponding to Data2, Data3, and Data 4 are written to clusters within the actual data area by the write process execution unit 13 in the sequential order, for example, from the empty area cluster having the smallest address.

Figure 16:
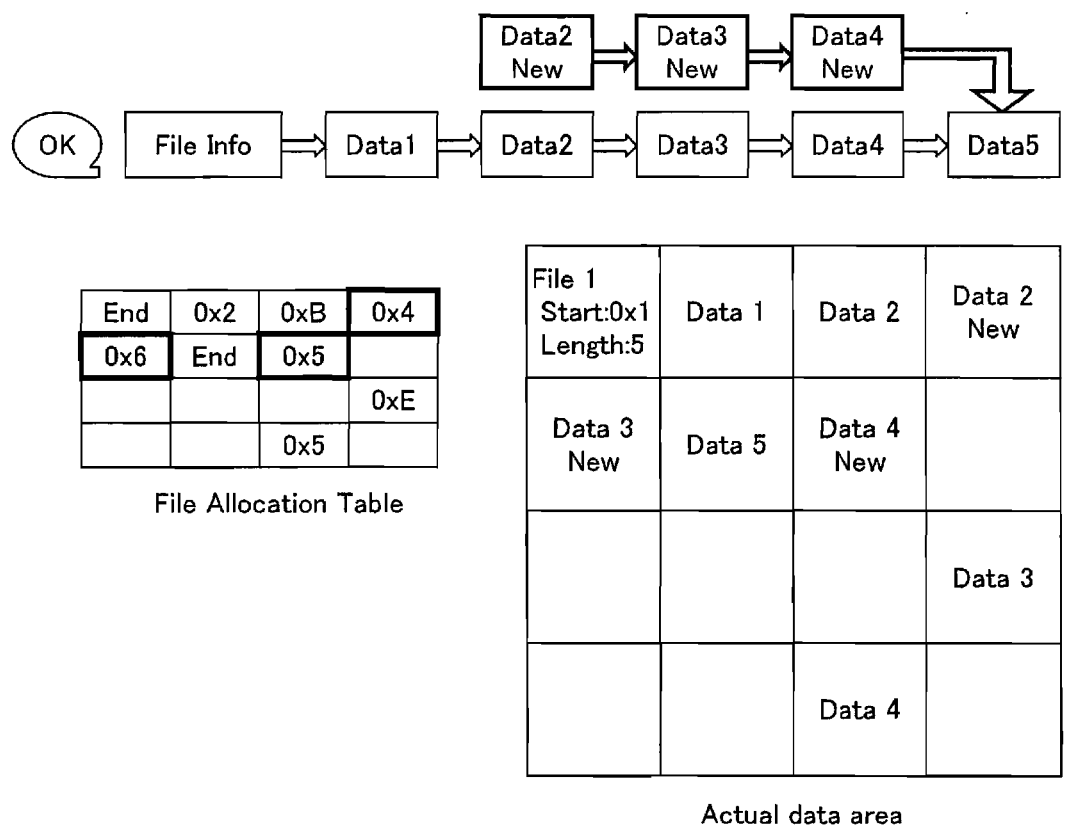
FIG. 16 is a diagram (No. 2) explaining the operations of the write processing unit in the first embodiment.

In the subsequent FIG. 16, the (pointer) information which indicates that "Data2 New", "Data3 New", and "Data4 New" is connected in this order, and "Data4 New" is connected to "Data5" is written to the FAT entries which correspond to each of the clusters, "Data2 New" "Data3 New", and "Data4 New".

Figure 17:
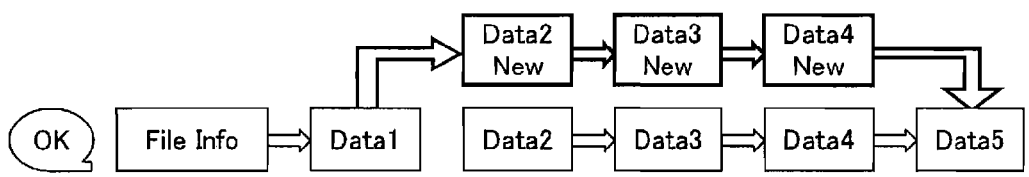
FIG. 17 is a diagram (No. 3) explaining the operations of the write processing unit in the first embodiment.

In addition, in the subsequent FIG. 17, the pointer of the FAT entry corresponding to "Data1" is changed to point "Data2 New" cluster by write process execution unit 13.

Figure 18:
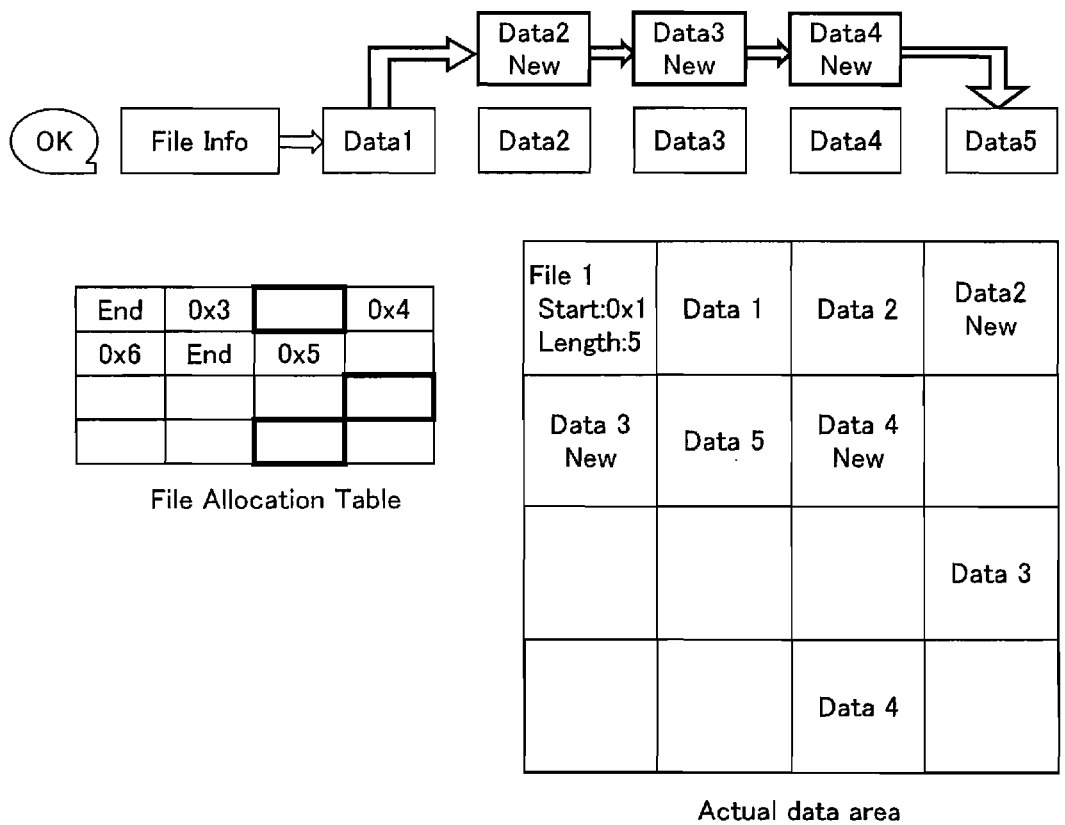
FIG. 18 is a diagram (No. 4) explaining the operations of the write processing unit in the first embodiment.

Furthermore, in the subsequent FIG. 18, the "Data2", "Data3", and "Data 4" clusters of the actual data area are freed by the freeing unit 15, by setting the pointer of the FAT entries corresponding to "Data2", "Data3", and "Data 4" clusters to NULL.

Figure 19:
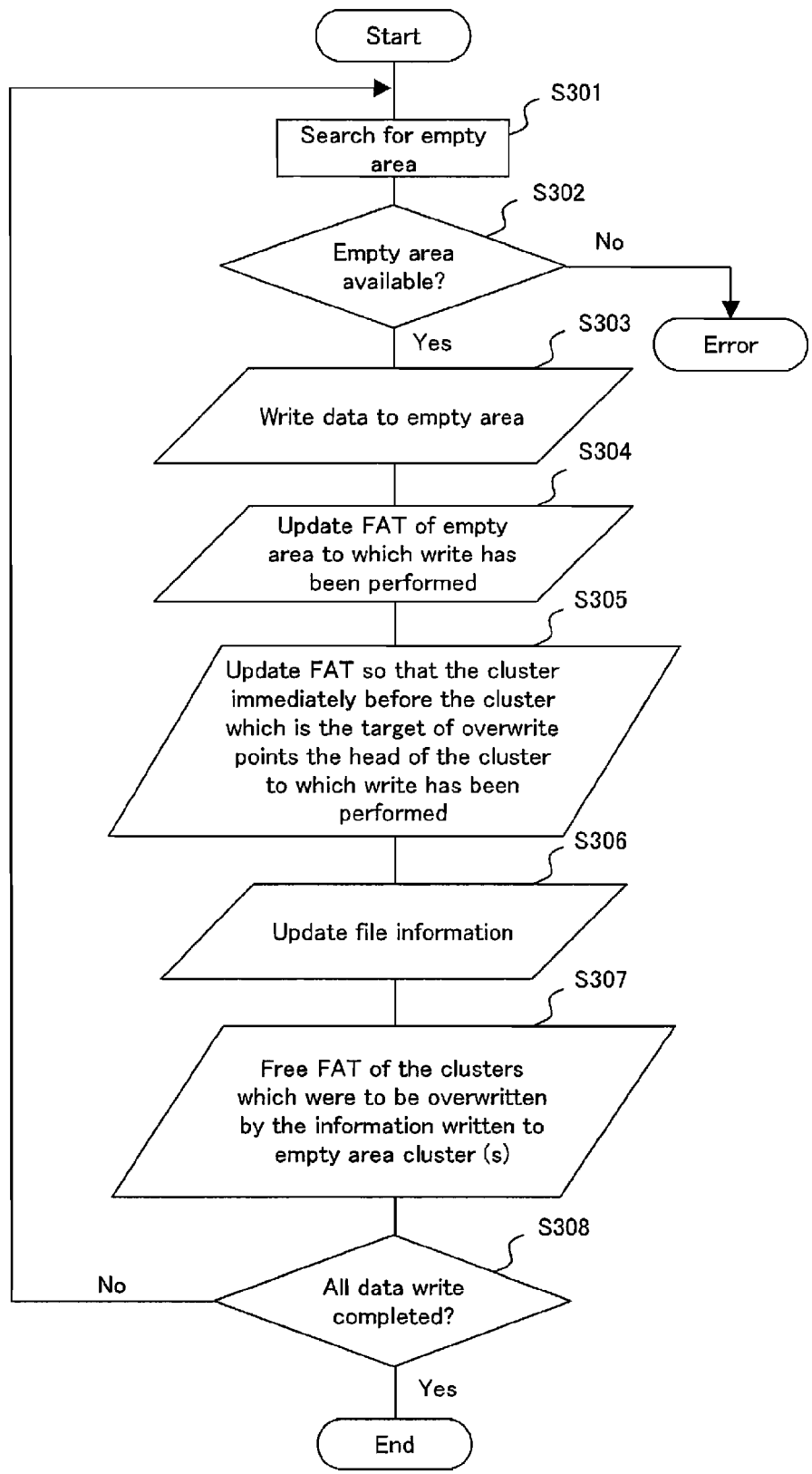
FIG. 19 is a flowchart of an overwrite process in the first embodiment.

FIG. 19 is a flowchart of the overwrite process in the first embodiment. This procedure is performed by the write processing unit in FIG. 14.

In FIG. 19, first, empty area clusters within the actual data area are searched for by the empty area search unit 12, by reading FAT, in step S301.

Write process execution unit 13 determines whether or not empty areas exist, in step S302, from the received search results. If no empty area clusters exist, the chain of processing is terminated as (empty area) error. On the other hand, if (one or more) empty area cluster(s) exists, the process advances to step S303, and in this step S303, data which should be overwritten to the cluster specified as overwrite target is written to the empty area clusters in the search results. Then, in the subsequent step S304, the pointer information of the FAT corresponding to the empty area clusters to which write was performed in step S303 is changed. In step S305, the pointer of the FAT which corresponds to the cluster immediately before the cluster specified as the overwrite target, out of the clusters storing the actual data of the file which is the overwrite target, is changed to point the head cluster of the clusters to which write was performed in step S303.

In the subsequent step S306, file information, for example, the last update time is changed (updated). Then in step S307, by setting the pointer of the FAT entry corresponding to the clusters which were to be overwritten by the information written to the empty area clusters to NULL, these clusters which were to be overwritten are freed (becomes empty areas).

In the subsequent step S308, whether or not all data write has been completed, or in other words, whether or not there are any sections wherein information within the data included in the write instruction (information to be overwritten) is not written to the empty area clusters is determined. If all data write is not completed, or in other words, if there are less empty area clusters found and obtained through step S301 than the number of clusters specified as overwrite targets, the process returns to step S301 and searched again for empty areas. On the other hand, if all data write has been completed, this chain of processing is completed.

In this way, in the first embodiment, because the data which should be overwritten to the clusters specified as the write target is written to the empty area clusters within the actual data area which has been searched and obtained, if the these empty area clusters can secure the number of clusters corresponding to the data included in the write instruction from the application, the data which should be overwritten can be written to the empty area clusters all at once. In this case, by comparing this to the conventional example wherein data is directly overwritten to this write target cluster, it is possible to eliminate the risk of storing incomplete data within the actual data area due to the power supply interruption during data overwrite, so when a power supply interruption and the like occur, the period wherein there is risk of data damage is shortened.

A second embodiment is explained next. Although the file overwrite processing was addressed in the first embodiment, file move processing is addressed in the second embodiment.

Figure 20:
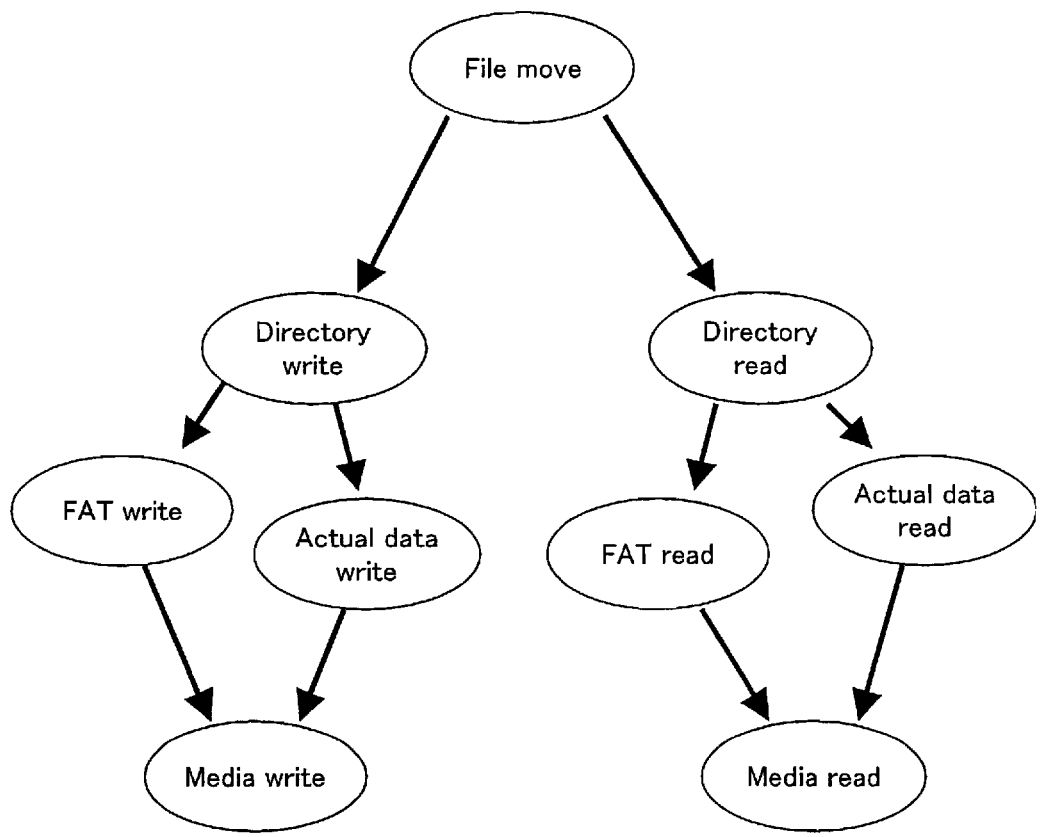
FIG. 20 is a diagram showing the call relation between the processing booted at the file system-end when the instruction from an application is to move a file.

FIG. 20 is a diagram showing the call relation between the processing booted at the file system when the instruction from an application is to move a file. As shown in FIG. 20, when a move instruction to a file is output from the application to the file system, the corresponding "file move" process is called in the file system.

From this "file move" process, "directory read" and "directory write" processes are called as processes for changing the directory entries. From the "directory read" process, "FAT read" and "actual data read" processes, for reading FAT and actual data area from the media (secondary memory) to the primary memory, are called, and from the "directory write" process, "FAT write" process and "actual data write" processes, for writing data updated in the FAT and actual data area within the primary memory to the media (secondary memory), are called.

Figure 21:
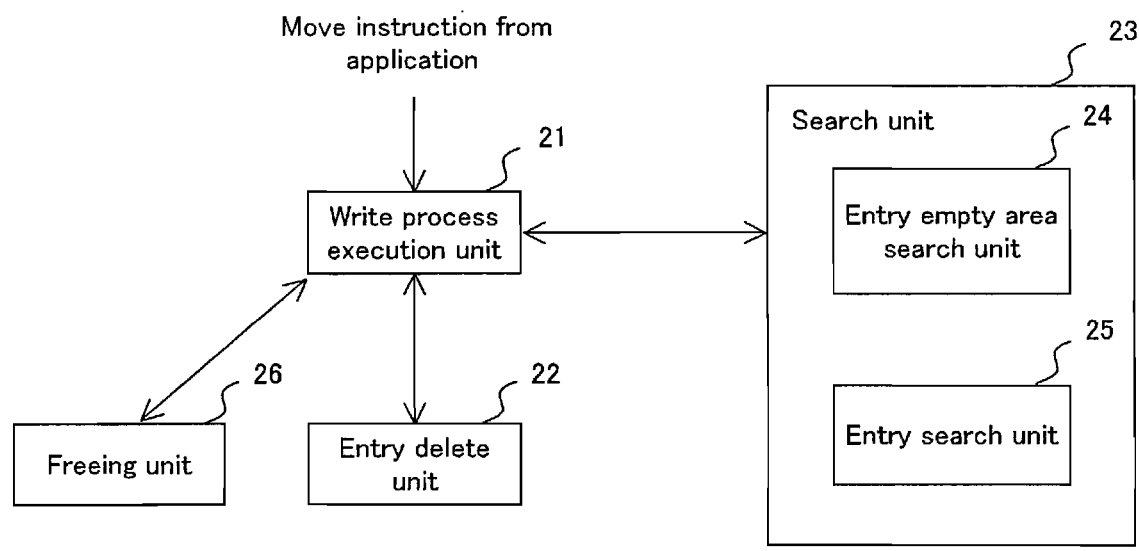
FIG. 21 is a block diagram showing the configuration of the write processing unit in a second embodiment of the present invention.

FIG. 21 is a block diagram showing the configuration of the write processing unit in a second embodiment of the present invention.

In FIG. 21, the write processing unit is configured between the application and the device driver, and a process for outputting instruction corresponding to the file information write instruction from the application to the device driver is performed.

In FIG. 21, the write processing unit comprises: search unit 23 for searching the entry of the directory of the destination of the movement and finding whether or not the write instruction is a file move which is accompanied by overwrite; based on whether or not this write instruction of the file move is accompanied by overwrite, write process execution unit 21 for changing or generating a directory entry of a file in a destination of the movement so as to link to the actual data of the file of the source of the movement, in a state wherein the link between the directory entry of the file of the source of the movement and the actual data of the file of the source of the movement is kept; entry delete unit 22 for deleting the directory entry of the file of the source of the movement; and freeing unit 26 for freeing actual data which the file of the destination of the movement had been pointing to before the write instruction when the write instruction is determined, by the search, to be a file move which is accompanied by overwrite. Each unit in FIG. 21 corresponds, for example, to combinations of CPU51 and RAM53 in FIG. 26.

The operations of the write processing unit in the present embodiment are explained below.

First, after the write process execution unit 21 receives the file move instruction from the application, search unit 23 is booted with the reception of this move instruction acting as the trigger. This search unit 23 comprises entry search unit 24 and entry empty area search unit 25. First, whether or not there is a file name within the directory entry of the directory of the destination of the movement which matches the file name of the destination of the movement designated by the move instruction is searched by the entry search unit 24. If there is no match, the move instruction is determined not to be accompanied by an overwrite, and subsequently, whether or not empty area for writing the entry information to be added to the directory of the destination of the movement exists in the clusters which store the directory entry of this directory of the destination of the movement is searched. If there is empty area within this directory entry, the entry information of the file to be added is written to this empty area within the directory entry so as to be linked to the actual data of the file of the source of the movement.

On the other hand, if it is determined that there is a file name within the directory entries of the directory of the destination of the movement which matches the file name of the destination of the movement designated by the move instruction, changes are made so that the entry information of this matching file is linked to the actual data of the file of the source of the movement. Regardless of the search results of entry search unit 24, the directory entry of the file of the source of the movement is deleted by the entry delete unit 22.

Write process execution unit 21 determines whether or not the write instruction is a file move which is accompanied by overwrite based on the search result of the search unit 23. If it is determined to be a movement accompanied by an overwrite, freeing unit 26 is booted and corresponding entries within the FAT are cleared to free the actual data to which the file of the destination of the movement had been pointing before the move instruction.

The process of the write process unit for processing a file move instruction from the application in the present embodiment is explained below, in reference to FIG. 22 to FIG. 24. However, in these diagrams, for comparison with prior art, the movement of ¥dir¥dir1¥file1 to ¥dir¥dir2¥file2 is addressed as is in the explanation of the prior art.

Figure 22:
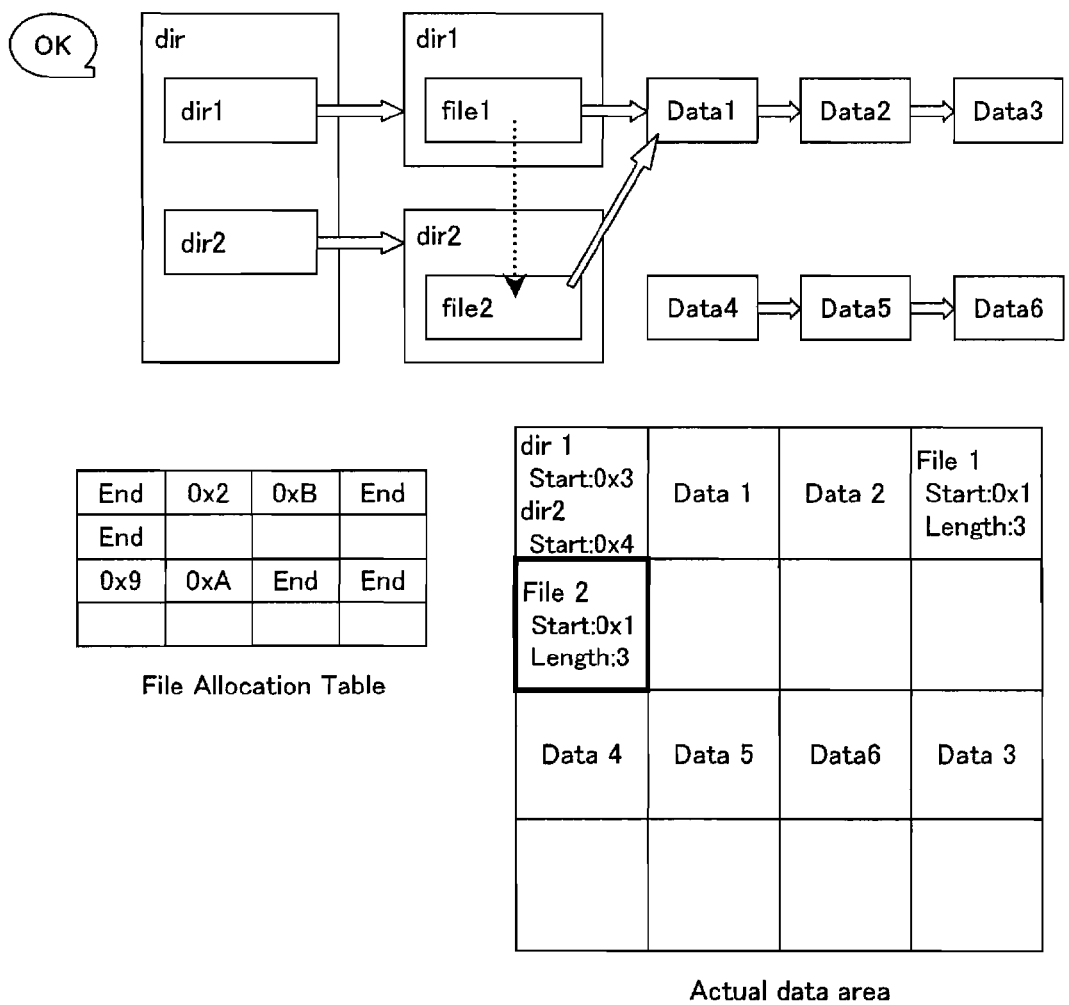
FIG. 22 is a diagram (No. 1) explaining the operations of the write processing unit in the second embodiment.

FIG. 22 shows a case wherein file file2 already exists within the directory dir2 of the destination of the movement. Therefore, entry search unit 25 returns the fact that file file2 of the same name already exists within the directory dir2 of the destination of the movement as the search result to write process execution unit 21.

Write process execution unit 21 changes the directory entry of file file2 in the destination of the movement to point the head actual data Data1 of file file1 in the source of the movement, based on this search result information. In other words, the directory entry of file file2 in the actual data area of the destination of the movement is changed.

In the prior art, first, the files (file1 and file2) which points at the actual data area cluster corresponding to Data1 within the directory entry in the source and the destination of the movement was not deemed to exist as in FIG. 22 based on the fact that the directory entry is deleted after saving the directory entry of the file in the source of the movement to the primary memory.

This is due to the fact that, being conventionally held to the common rule that "file delete function is implemented as a part of the process for file move", the state such as that shown in FIG. 22 is a state wherein the cluster chain below Data1 which is a required data connecting to the directory entry of either file is deleted simultaneously when implementing the file delete function by specifying one of file1 and file2, and is not considered preferable.

Figure 23:
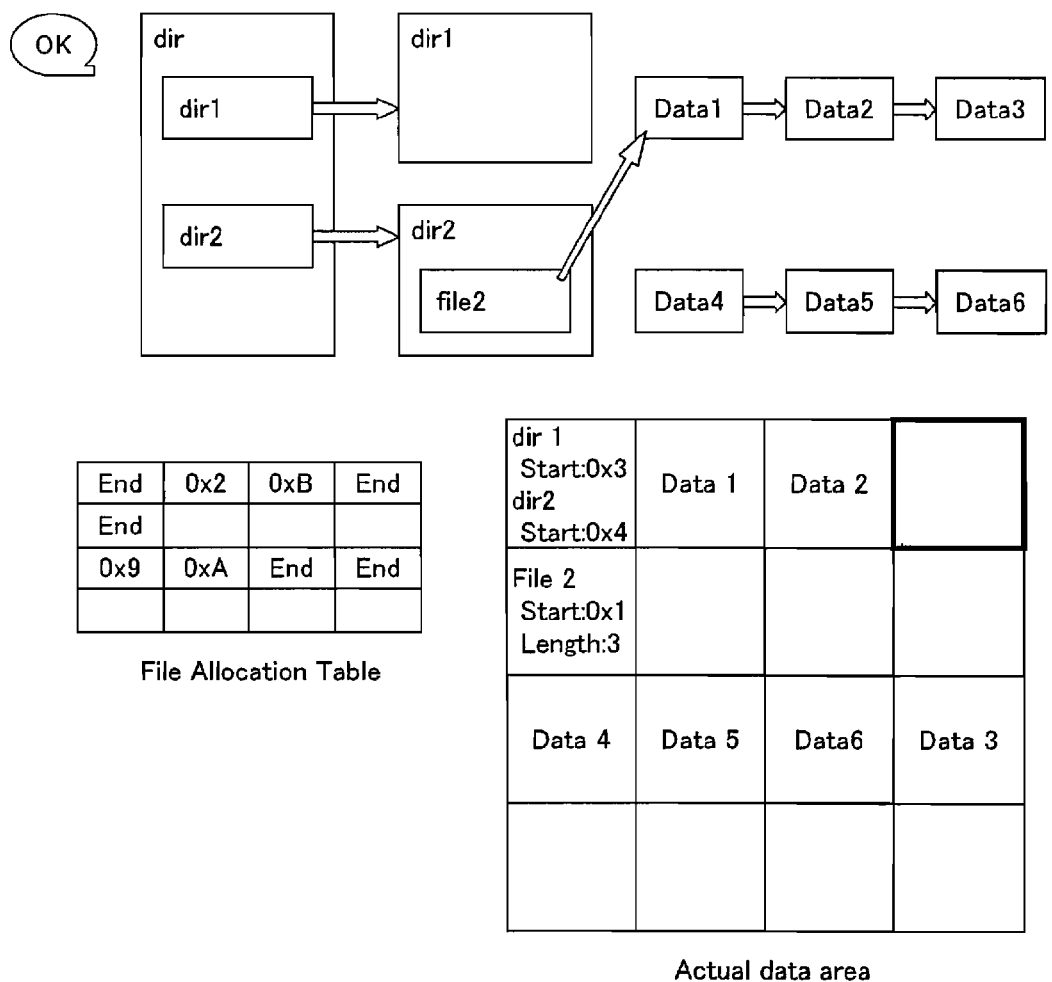
FIG. 23 is a diagram (No. 2) explaining the operations of the write processing unit in the second embodiment.

In this embodiment, the drawback above can be prevented by deleting information regarding the file in the source of the movement from the directory entry of the file in the source of the movement, using the entry delete function which is a part of the file delete function as is shown in FIG. 23.

In addition, the procedure for movement in this embodiment also has an effect in that the period wherein write failures occur due to accidental power supply interruptions is shortened. In other words, because the file information in the destination of the movement is changed to point head actual data Data1 of the file in the source of the movement in the directory entry in the destination of the movement while the file information of the source of the movement exists in the directory entry of the file in the source of the movement within the secondary memory, the period wherein the file information of the source of the movement only exists in the primary memory is eliminated, and the period wherein write failure occurs due to accidental power supply interruption is shortened.

Figure 24:
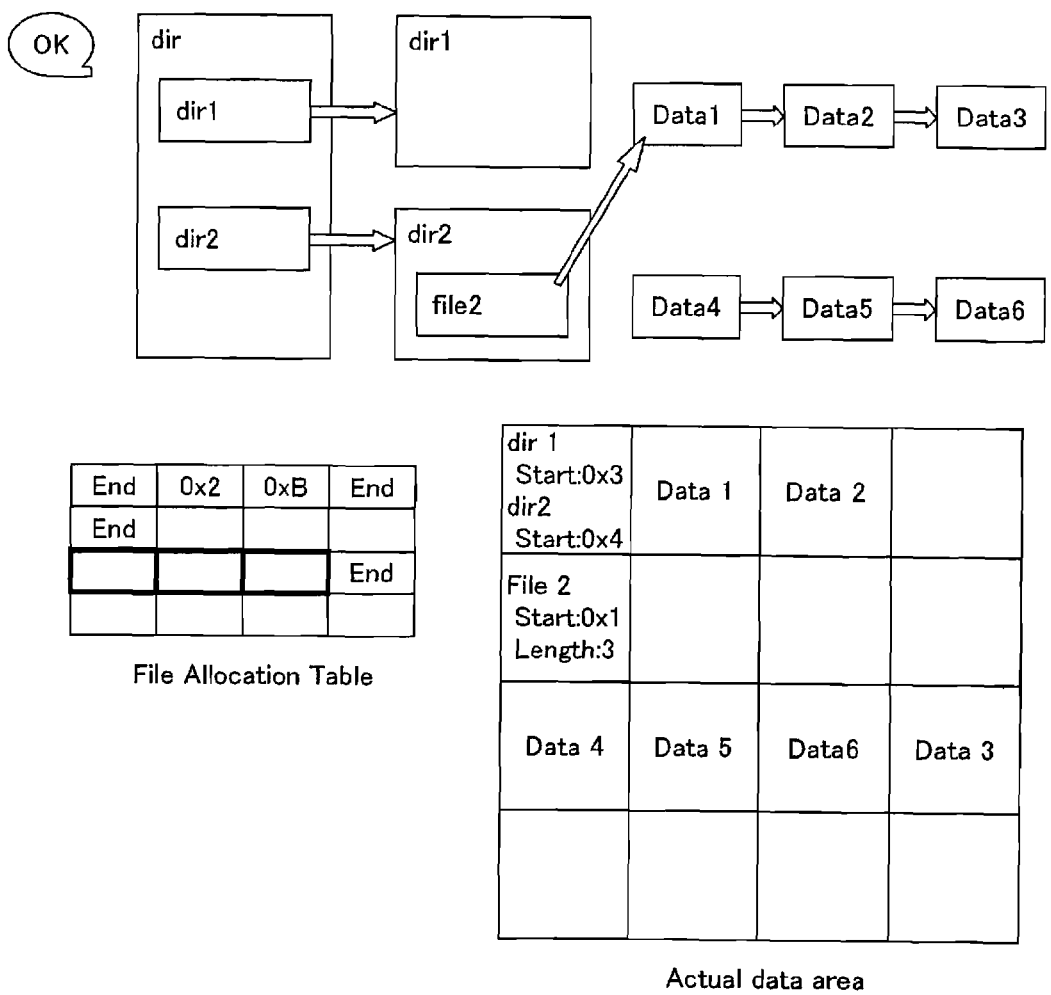
FIG. 24 is a diagram (No. 3) explaining the operations of the write processing unit in the second embodiment.

Next, in FIG. 24, the cluster chain subsequent to actual data Data4 to which the directory entry of the file in the source of the movement was pointing previously is freed by clearing the corresponding entries in the FAT.

Although a case wherein a file with the same name as the file name (file2) designated by the move instruction exists in the directory (dir2) of the destination of the movement was explained above, the same can be considered for the process in cases when the file with the same name does not exist in the directory of the destination of the movement. In this case, write process execution unit 21 creates the information in file file2 of the destination of the movement to point the head actual data Data1 of the file file2 in the source of the movement, based on the search result information.

Figure 25:
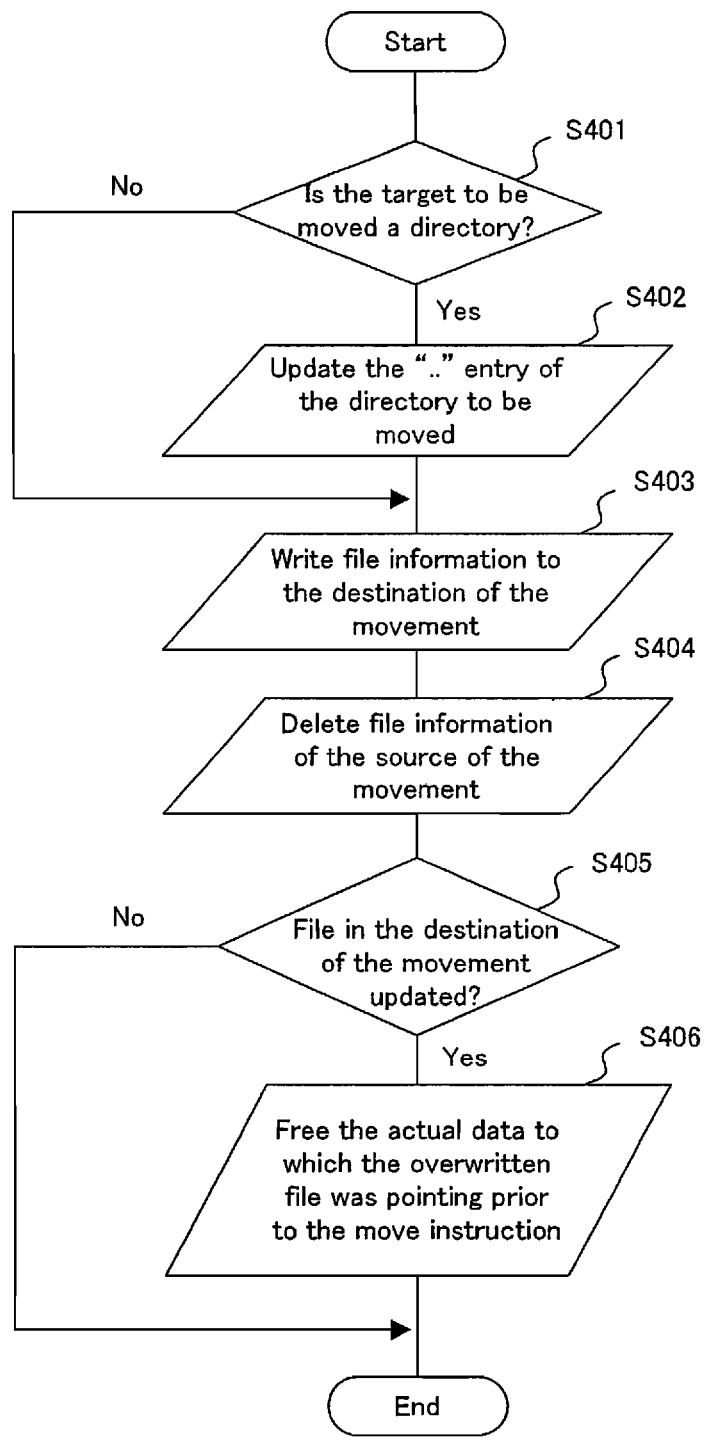
FIG. 25 is a flowchart of a move process in the second embodiment.

FIG. 25 is a flowchart of a move process in the second embodiment. This flowchart is executed by the write processing unit of FIG. 21.

Although the procedures in FIG. 25 explain file move, in the case of moving directory, processing of steps S 401 and S402 are added. In other words, in step S401, whether or not the target to be moved is a directory is determined, and if it is a directory, the information regarding parent directory "..". of this target directory is changed from the (parent) directory of the source of the movement to the (parent) directory of the destination of the movement in step S402.

In the subsequent step S403, the directory of the destination of the movement is searched, and based on whether or not the file designated as the destination of the movement already exists within this directory, file information of the directory entry of the directory of the destination of the movement is changed or generated to point the head actual data of the file in the source of the movement by write process execution unit 21.

Then in step S404, file information of the source of the movement is deleted from the directory entry of the directory in the source of the movement by entry delete unit 22.

In the subsequent step S405, whether or not the file information has been overwritten in the destination of the movement is determined. If it is determined that it has not been overwritten, the chain of processing is terminated immediately, and if it is determined to have been overwritten, the actual data to which the file in the destination of the movement has been pointing to before the move instruction is freed in step S406.

Figure 26:
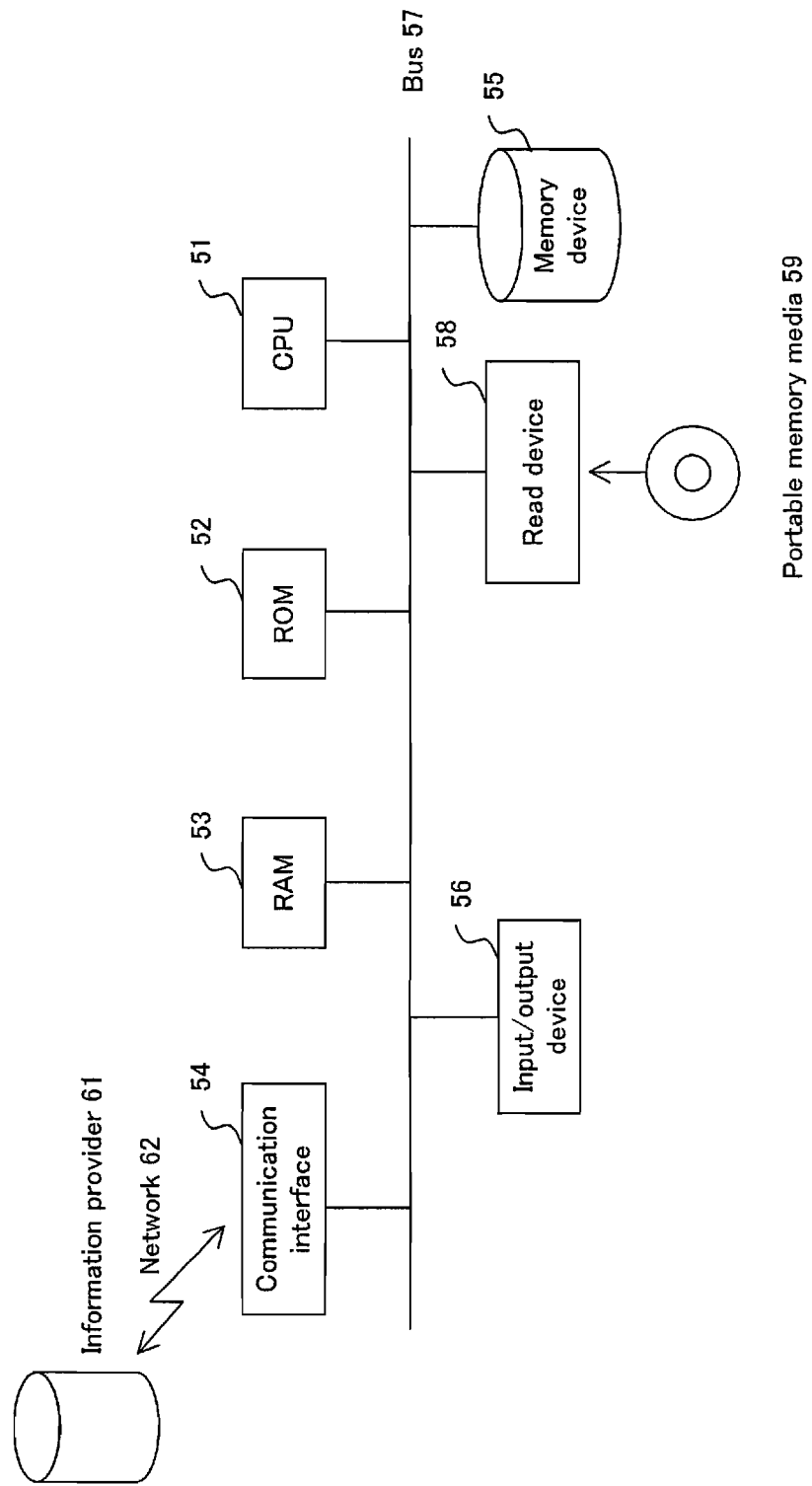
FIG. 26 is a diagram showing the hardware environment when actualizing each embodiment of the present invention by program.

The write processing unit in each embodiment of the present invention can be configured as software. FIG. 26 is a diagram showing the hardware environment when actualizing each embodiment of the present invention by program.

In FIG. 26, the computer as hardware is comprised by CPU51, ROM52, RAM53, communication interface 54, input/output device 56, memory device 55, and (memory media) reader 58, connected via bus 57.

In FIG. 26, CPU51 controls the entire computer, and RAM 53 is a primary memory which temporarily stores data stored within the secondary memory such as memory device 55, during program execution, data update and the like.

The user can give various instructions such as file overwrite and file move to the application via the input/output device 56. In addition, information on the results processed by the write processing unit in the embodiment is presented to the user via the application.

Other than program and data stored in the memory device 55, program and data of a portable memory media 59 which has been read by the reader 58 and program and data of the information provider 61 which has been read via network 62 and communication interface 54 can be used within the computer.

Figure 27:
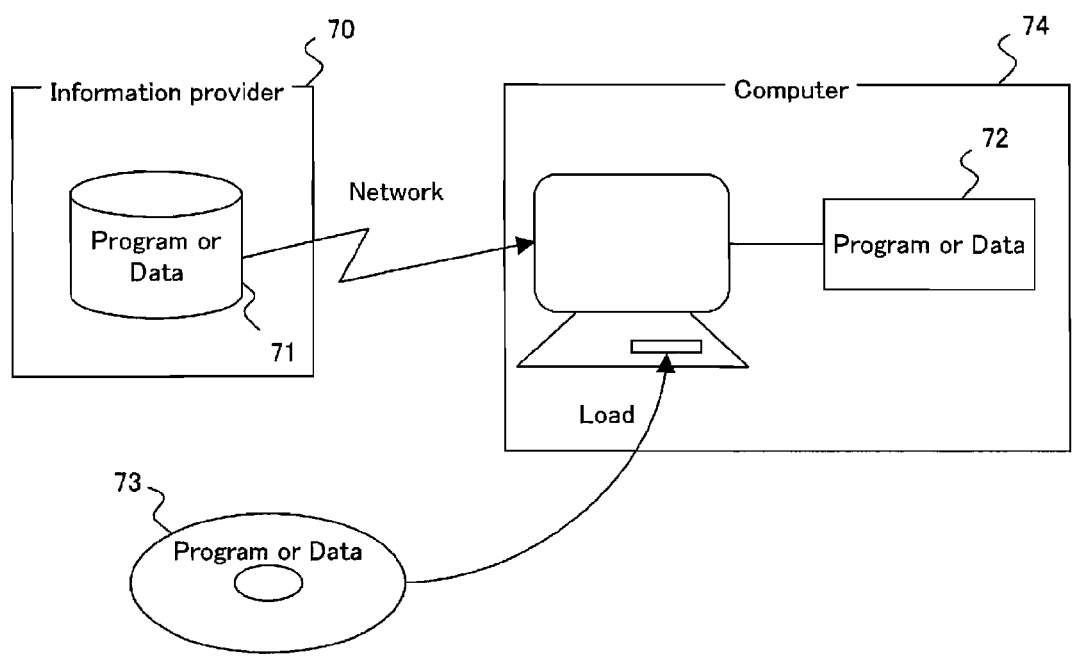
FIG. 27 is a diagram explaining the loading of the program.

FIG. 27 is a diagram explaining the loading of the program.

File write processing such as file overwrite and move processing of the present invention can obviously be actualized by a common computer 74. In this case, it is possible to load a program for the process in this present invention and the like from the memory device 72 of the computer 74 to the memory in computer 74 and execute, or to load a program for process in this present invention and the like from the portable memory media 73 to the memory in computer 74 and execute, or to load a program for process in this present invention and the like from the memory device 71 of the program provider 70 to the memory in computer 74 via network and execute.

What is claimed is:

1. A file information write processing method wherein a computer executes a process for outputting instruction corresponding to a file information write instruction from an application to a device driver, the method comprising:

searching directory entries of a directory in a destination of a movement to determine whether or not the write instruction is a file move instruction accompanied by overwrite when a directory entry is issued, wherein the file move instruction moves a file within a file system which has a FAT table and an actual data area, wherein the directory entry which indicates a cluster storing actual data of a leading end of the file is held in another cluster, and cluster chain information which indicates a link of other clusters storing actual data of the file is held in the FAT table;

changing or generating a directory entry of a file in the destination of the movement so as to link to actual data of a file in a source of the movement with the link between the directory entry of the file in the source of the movement and actual data of the file in the source of the movement being kept, according to whether or not said write instruction is a file move accompanied by overwrite;

deleting the directory entry of the file in the source of the movement;

writing the file in the source of the movement in the destination of the movement generated from data which is not changed and data which is newly overwritten; and freeing actual data to which the file in the destination of the movement had been pointing prior to the move instruction.

2. A memory media to which a file information write processing program which enables a computer to execute a process for outputting instruction corresponding to a file information write instruction from an application to a device driver is stored, wherein the program enables the computer to execute a method comprising:

searching directory entries of a directory in a destination of a movement to determine whether or not the write information is a file move instruction accompanied by overwrite when a directory entry is issued, wherein the file move instruction moves a file within a file system which has a FAT table and an actual data area, wherein the directory entry which indicates a cluster storing actual data of a leading end of the file is held in another cluster, and cluster chain information which indicates a link of other clusters storing actual data of the file is held in the FAT table;

changing or generating a directory entry of a file in the destination of the movement so as to link to actual data of a file in the source of the movement with the link between the directory entry of a file in the source of the movement and actual data of the file in the source of the movement being kept, according to whether or not said write instruction is a file move accompanied by overwrite;

deleting the directory entry of the file in the source of the movement;

writing the file in the source of the movement in the destination of the movement generated from data which is not changed and data which is newly overwritten; and freeing actual data to which the file in the destination of the movement had been pointing prior to the move instruction.

* * * * *

UNITED STATES PATENT AND TRADEMARK OFFICE
CERTIFICATE OF CORRECTION

PATENT NO. : 8,468,290 B2  Page 1 of 1
APPLICATION NO. : 12/212439
DATED : June 18, 2013
INVENTOR(S) : Abe It is certified that error appears in the above-identified patent and that said Letters Patent is hereby corrected as shown below:

On the Title Page Item [73] (Assignee), Line 1, Delete "Fujistu" and insert -- Fujitsu --, therefor.

In the Specification

Column 1, Line 9, Delete "Sep. 27, 2007," and insert -- Sep. 27, 2005, --, therefor.

Signed and Sealed this
Twenty-fifth Day of February, 2014

Michelle K. Lee
*Deputy Director of the United States Patent and Trademark Office*